United States Patent
Chappell, III et al.

(10) Patent No.: US 11,822,719 B1
(45) Date of Patent: Nov. 21, 2023

(54) SYSTEM AND METHOD FOR CONTROLLING DIGITAL CINEMATIC CONTENT BASED ON EMOTIONAL STATE OF CHARACTERS

(71) Applicant: Warner Bros. Entertainment Inc., Burbank, CA (US)

(72) Inventors: Arvel Chappell, III, La Mirada, CA (US); Michael Zink, Altadena, CA (US); Ha Nguyen, Fullerton, CA (US); Clayton Mosher, Los Angeles, CA (US); Andrew Veeder, Los Angeles, CA (US); Michael Martinez, Redondo Beach, CA (US); Shanshan Sun, Chino Hills, CA (US); Gary Lake-Schaal, Alameda, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

(21) Appl. No.: 17/963,624

(22) Filed: Oct. 11, 2022

(51) Int. Cl.
*G06F 3/01* (2006.01)
(52) U.S. Cl.
CPC .................... *G06F 3/015* (2013.01)

(58) Field of Classification Search
CPC ........................................ G06F 3/015
USPC ........................................ 345/156
See application file for complete search history.

(56) References Cited

U.S. PATENT DOCUMENTS

| | | | |
|---|---|---|---|
| 9,619,469 B2* | 4/2017 | Kiddle | G06F 16/489 |
| 2012/0135804 A1* | 5/2012 | Bender | A61B 5/165 |
| | | | 463/36 |

* cited by examiner

Primary Examiner — Calvin C Ma
(74) Attorney, Agent, or Firm — Alston & Bird LLP

(57) ABSTRACT

Provided is a system for controlling digital cinematic content based on emotional state of characters. A focus on one or more computer-controlled characters appearing in digital cinematic content is determined based on emotion indicators of a first user actively interacting with at least the one or more computer-controlled characters. A set of emotion indicators is inferred for each of the one or more computer-controlled characters based on one or more criteria and multifactor feedback loops are created. A story line of the digital cinematic content and behavioural characteristics of the one or more computer-controlled characters are controlled to achieve a target emotional arc of the first user based on the multifactor feedback loops.

20 Claims, 10 Drawing Sheets

SYSTEM AND METHOD FOR CONTROLLING DIGITAL CINEMATIC CONTENT BASED ON EMOTIONAL STATE OF CHARACTERS

CROSS-REFERENCE TO RELATED APPLICATIONS/INCORPORATED BY REFERENCE

This Patent Application makes reference to U.S. patent Ser. No. 11/303,976 issued on Apr. 12, 2022. The above-referenced patent application is hereby incorporated herein by reference in its entirety.

FIELD OF TECHNOLOGY

Certain embodiments of the disclosure relate to digital content processing systems. More specifically, certain embodiments of the disclosure relate to a system and method for controlling digital cinematic content based on emotional state of characters.

BACKGROUND

Owing to the rise of metaverse—the next generation of the Internet, and recent advancements in various interdisciplinary scientific fields, such as wireless communication, display technologies, computer vision techniques, and the like, the power of immersive technologies is unprecedently bridging digital (or virtual) and real (or physical) worlds and breaking down the barriers to enhanced learning, collaboration, knowledge sharing, gaming, and many more. Such immersive technologies, such as augmented reality (AR), virtual reality (VR), and mixed reality, not only place a viewer entirely in a fictional world, but also add intelligence to the virtual world around the viewer in the metaverse.

Presently, such immersive technologies are blurring the boundary between narrative and interactive entertainment, blending branching and interactive techniques, thereby presenting further opportunities to enthrall the viewers. Further, proliferation of smart devices and Internet of Things (IoT) devices powered by network-connected sensors is enabling the gathering of more real-time and batch data about digital cinematic content consumers than ever before. Still, the foundation for an engaging digital cinematic content remains a compelling story, convincing actors and acoustically appealing arrangements targeting broadest possible audience for a given genre of the digital cinematic content.

For such digital cinematic content, apart from branching, content producers use many techniques to gauge an appeal of the digital cinematic content based on emotion indicators of a player actor. The player actor may correspond to a user of a client device or interface equipped with biometric sensors detecting neurological or neurophysiological state of the user. Accordingly, content narrative of the digital cinematic content may be fine-tuned to match the emotion indicators of the user with a target story arc. Further, user engagement with the digital cinematic content may be rated based on the detected neurological or neurophysiological state of the player actor only.

It would be desirable, therefore, to develop new methods and other innovative technologies for controlling and rating the digital cinematic content, which overcome these and other limitations of the prior art and deliver more compelling entertainment experiences for futuristic audiences.

Further limitations and disadvantages of conventional and traditional approaches will become apparent to one of skill in the art, through comparison of such systems with some aspects of the present disclosure as set forth in the remainder of the present application with reference to the drawings.

SUMMARY

Systems and/or methods are provided for controlling digital cinematic content based on emotional state of characters, substantially as shown in and/or described in connection with at least one of the figures, as set forth more completely in the claims.

These and other advantages, aspects and novel features of the present disclosure, as well as details of an illustrated embodiment thereof, will be more fully understood from the following description when considered in conjunction with the drawings and the disclosed examples, which encompass all such aspects and their equivalents.

BRIEF DESCRIPTION OF SEVERAL VIEWS OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION OF THE DISCLOSURE

Various embodiments of the disclosure may be found in a method and system for controlling digital cinematic content based on emotional state of characters. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Traditionally, existing systems enable branching or control of the digital cinematic content based on emotion indicators of the users, i.e., player actors, of the digital cinematic content. For example, if the digital cinematic content is a VR game and the emotional state of the user indicates that the user is angry and experiencing anxiety, the existing systems merely change a difficulty level of the VR game. Such systems deem computer-controlled characters of the digital cinematic content as dependent, non-autonomous, and lacking emotions as such computer-controlled characters are entirely controlled by emotion indicators of the users or an emotion arc of the story of the digital cinematic content. Thus, the existing systems provide limited realism, interest, or enjoyment of the digital cinematic content and thus, the target emotional arc of the users may not be met effectively.

In contrast, the system and method described herein is generally directed towards controlling the digital cinematic content based on emotional state of characters in the digital cinematic content. The digital cinematic content may correspond to a cinematic AI in which the digital cinematic content may be adapted to increase or maintain narrative tension experienced by the user, based on real time emotion indicators of the user and inferred set of emotion indicators of the one or more computer-controlled characters. Such a digital cinematic content experience is more realistic, engaging, interesting, and enthralling for the users as the target emotional arc of the users is achieved more effectively than ever before. The real-time emotion indicators, in accordance with the proposed system and method, are personalized via the viewing habits of the player actor. Accordingly, it may be ensured that the play actor experiences similar time-varying emotional arcs in an interactive experience as the player actor would experience while watching favourite non-interactive shows. Thus, the proposed system and method may provide a real-time performance metric for each player actor allowing error correction (target arc recovery) for play throughs which stray too far away from target arcs. Such method facilitates a presence of the viewer within a narrative, allowing the viewer to "direct" the course of the story subconsciously, with the potential to uncover something new and surprising as the player actor's nervous system acclimates.

Figure 1:
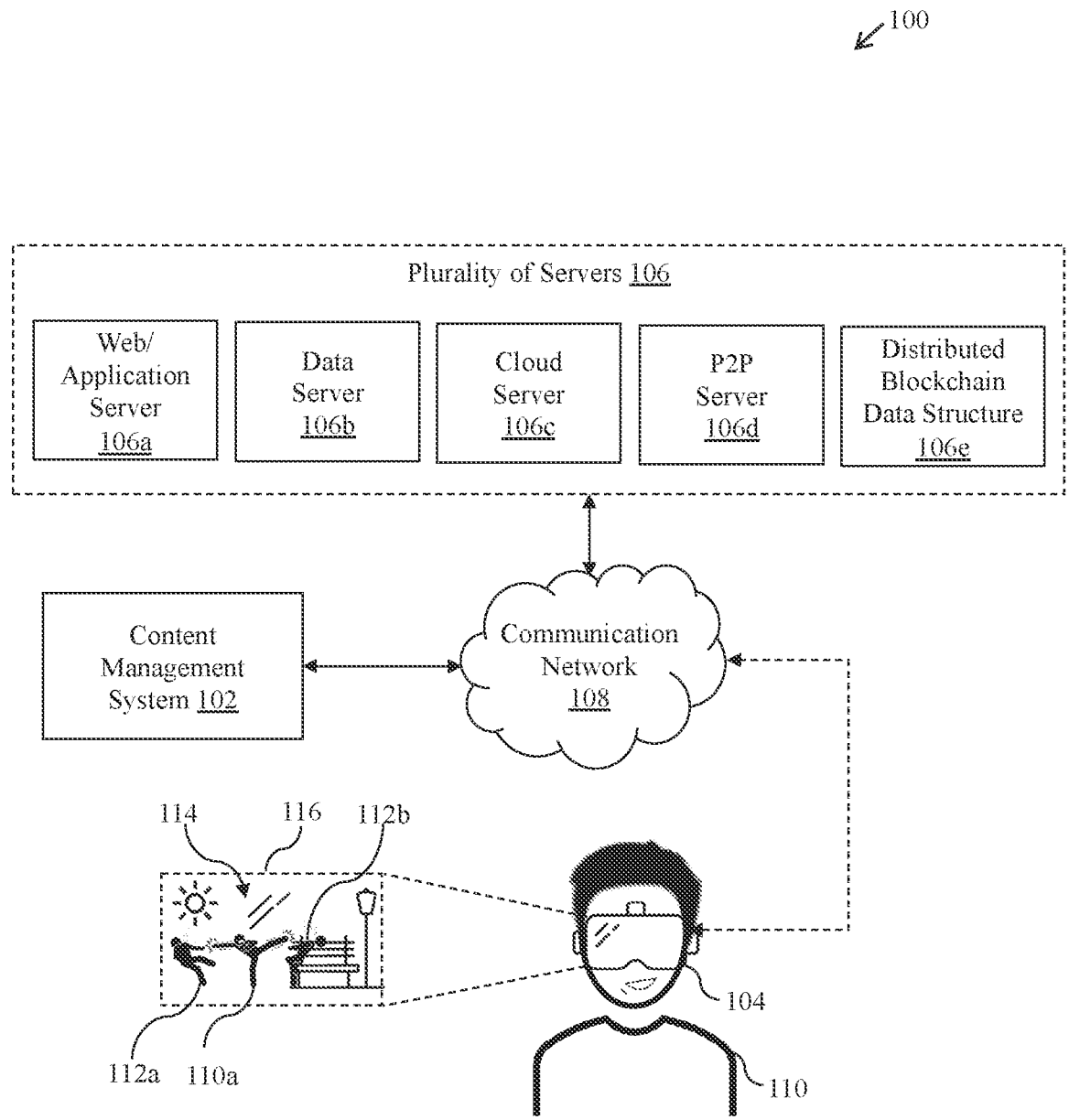
FIG. 1 is a block diagram that illustrates an exemplary environment for controlling digital cinematic content based on emotional state of characters, in accordance with various aspects and example implementations of the present disclosure.

FIG. 1 is a block diagram that illustrates an exemplary environment for controlling digital cinematic content based on emotional state of characters, in accordance with various aspects and example implementations of the present disclosure. Referring to FIG. 1, there is shown a network environment 100 which may be a client-server environment comprising a plurality of servers and client entities, in accordance with an embodiment of the disclosure. However, it may not be so limited, and other architectures of the network environment 100 may also be possible without any deviation from the scope of the disclosure. As shown in FIG. 1, the network environment 100 may include a content management system 102, a client device 104, a plurality of servers 106, communicatively coupled via a communication network 108. There are further shown a first user 110, a corresponding avatar 110a, and one or more computer-controlled characters 112a and 112b appearing in digital cinematic content 116.

The content management system 102 may comprise suitable logic, circuitry, interfaces, and/or code that may be configured to control the digital cinematic content 116 based on emotional state of characters in the digital cinematic content 116. The content management system 102 may be configured to control at least a story line of the digital cinematic content 116 and behavior and character of the one or more computer-controlled characters 112a and 112b to achieve a target emotional arc of the first user 110 based on multifactor feedback loops. The content management system 102 may further record user interactions with an application or other application inputs, outputs or internal states.

The client device 104 may comprise suitable logic, circuitry, interfaces, and/or code that may be configured to render and locally store the digital cinematic content 116 received from the web/application server 106. If stored locally, the client device 104 and the web/application server 106 may cooperate to handle sensor data and other player actor functions. In an embodiment, the client device 104 may be a medium through which the first user 110 may provide one or more user inputs to the content management system 102 via the client device 104.

In accordance with various embodiments, the client device 104 may be provided in various form factors, of which an immersive VR device provides but one example. Examples of other form factors may include, but are not limited to, a computing device, a mainframe machine, a server, a computer workstation, a smartphone, a cellular phone, a mobile phone, a gaming device, a tablet, and/or a consumer electronic (CE) device. The innovative methods, apparatus and systems described herein are not limited to a single form factor but may be used in any video output device suitable for cinematic output.

Each of the plurality of servers 106 may comprise suitable logic, circuitry, interfaces, and/or code that may be configured to provide a variety of services to other devices and systems in the network environment 100 communicatively coupled via the communication network 108. In an example, a web/application server 106a may contain documents and application code compatible with World Wide Web protocols, including but not limited to HTML, XML, PHP and Javascript documents or executable scripts. In another example, a data server 106b may be configured for storing data, for example video, audio-video, audio, and graphical content components of the digital cinematic content 116 for consumption using the client device 104, software for execution on or in conjunction with client devices, for example sensor control and emotion detection applications, and data collected from users or client devices. Data collected from client devices, such as the client device 104, or users may include, for example, sensor data and application data. In yet another example, a cloud server 106c and a peer-to-peer (P2P) server 106d may include multiple instances of discrete servers that cooperate with each other to perform functions of a single server. In an aspect, the cloud server 106c may act as a data sink for receiving sensor data (or emotion indicators) associated with the first user 110 and an inferred set of emotion indicators associated with the one or more computer-controlled characters 112a and 112b from the client device 104. In another aspect, application data may be served from a server accessing a distributed blockchain data structure 106e or the P2P server 106d operating contemporaneously as micro-servers or clients. Application state data may include, but not limited to, records of user interactions with an application or other application inputs, outputs or internal states. Applications may include software for control of cinematic content and supporting functions.

In accordance with an embodiment, the computing functionalities of various servers, such as the content management system 102 and each of the plurality of servers 106, as disclosed herein, may be implemented in one or more silicon cores in a reduced instruction set computing (RISC) processor, an ASIC processor, a complex instruction set computing (CISC) processor, FPGAs, and other semiconductor chips, processors, or control circuits.

It should be noted that the terms "processor" or "microprocessor" referred in FIG. 1 include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar device, combination of devices, or logic elements (hardware or software) that permit the execution of instructions.

The communication network 108 may include a communication medium through which the content management system 102, the client device 104, and the server 106 may communicate with each other. The communication network 108 may include a plurality of network ports and a plurality of communication channels for transmission and reception of communication data. The communication data may correspond to data received and/or exchanged, via the communication network 108, among the content management system 102, the client device 104, and the plurality of servers 106. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. The communication data may be transmitted or received via various wired and wireless communication protocols, the examples of which may include, but are not limited to, a short-range communication protocol, a Hypertext Transfer Protocol (HTTP), a File Transfer Protocol (FTP), a Simple Mail Transfer Protocol (SMTP), a Domain Name Server (DNS) protocol, a Transmission Control Protocol and Internet Protocol (TCP/IP), User Datagram Protocol (UDP), a Common Management Information Protocol (CMIP) Over Transmission Control Protocol/Internet Protocol TCP/IP (CMOT), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The communication data may be transmitted or received via at least one communication channel of a plurality of communication channels. The communication channels may include, but are not limited to, a wireless channel, a wired channel, or a combination of wireless and wired channel thereof. The wireless or wired channel may be associated with a data standard which may be defined by one of a Local Area Network (LAN), a Personal Area Network (PAN), a wireless personal LAN (WPLAN), a Wireless Local Area Network (WLAN), a Wireless Sensor Network (WSN), a WAN, a wireless communication network (WCN), and a Wireless Wide Area Network (WWAN), the Internet, cellular networks, Wireless Fidelity (Wi-Fi) networks, short-range networks (for example, Bluetooth® or ZigBee®), and/or any other wired or wireless communication networks or mediums. In accordance with an embodiment, the wired channel may be selected based on the bandwidth criteria. For example, an optical fiber channel may be used for a high bandwidth communication, and a coaxial cable (or Ethernet-based communication channel) may be used for moderate bandwidth communication. In accordance with various embodiments, any, some, combination, or all of the systems, engines, and/or sub-systems of the network environment 100 may be adapted to execute any operating system, such as Linux-based operating systems, UNIX-based operating systems, Microsoft Windows, Windows Server, MacOS, Apple iOS, Google Android, or other customized and/or proprietary operating system. The systems, devices, and/or servers of the network environment 100 may be adapted to execute such operating systems along with virtual machines adapted to virtualize execution of a particular operating system.

It should be noted that the communication between the various devices, systems and/or servers of the network environment 100 may be dynamically established based on auto-selection of the most optimal network from various available communication networks. The most optimal network may be automatically selected from the various available communication networks based on a plurality of network parameters. Non limiting examples of the plurality of network parameters may include link/signal quality, bandwidth, power, cost, throughput, security level, interference level, received signal strength, Quality of Service (QoS), network loads, distance, network connection time, network selection policy, and the like. In case of any adverse or untoward event, such as network failure or degraded network performance, the next optimal network may be dynamically selected in a seamless manner such that the established communication is not interrupted.

The first user 110 may correspond to a character actively participating in the digital cinematic content 116 via the avatar 110a or other agency and may also be referred to herein as a player actor. In case of a solitary immersive experience, the first user 110 may be actively interacting with a story arc, the one or more computer-controlled characters 112a and 112b, or other emotion-influencing objects 114 appearing in the digital cinematic content 116. In case of a communal or social immersive experience, the first user 110 may actively interact with other player actors, the one or more computer-controlled characters 112a and 112b, or other emotion-influencing objects 114 appearing in the digital cinematic content 116.

The first user 110 of the client device 104 equipped with or coupled to biometric sensors, may use the client device 104 or interface to interact with other player actors, the one or more computer-controlled characters 112a and 112b, or other emotion-influencing objects 114 by involuntarily exhibiting a neurological or neurophysiological state (e.g., emoting), whether or not using a controller to provide direct input. Accordingly, the narrative behavior of other player actors, the one or more computer-controlled characters 112a and 112b, or other emotion-influencing objects 114 may change without requiring an intentional action by the first user 110. The narrative behavior may refer to a behavior that changes the narrative, for example, character dialogue or actions. Thus, the first user 110 may affect the narrative by emoting inwardly or outwardly without taking an intentional action. The present description uses the terms—the first user 110 and the player actor—interchangeably when discussing the digital cinematic content 116.

The first user 110 may alter the narrative of the digital cinematic content 116 by achieving a biometric-detectable neurological state without any intentional action. By expression of emotion, the first user 110, as a player actor in the cinematic AI narrative, may interact with the digital cinematic content 116 in various ways, for example, natural language communication with the one or more computer-controlled characters 112a and 112b and other player actors, locomotion and virtual locomotion within an immersive experience, and emotional feedback loop with other player actors, the one or more computer-controlled characters 112a and 112b and the narrative environment.

The one or more computer-controlled characters 112a and 112b, such as virtual characters, bots or NPCs, may play pivotal roles within the digital cinematic content 116. Such characters are an example of supportive content, which are autonomous and independent from the story arc, but corresponding inferred set of emotion indicators influence the selection of next scene of the digital cinematic content 116 and control the behavioural characteristics, such as dialogues and interactions, of other computer-controlled characters to achieve a target emotional arc of the first user 110.

The emotion-influencing objects 114 may appearing in any scene, which may affect the appearance of the scene, or change the audio content of the scene. The emotion-influencing objects 114 may include the one or more computer-controlled characters 112a and 112b, their dialogues, props, scripts, backgrounds, environments, lighting schemes, surface colours and textures, audio tracks, or any other object in a scene that may be controlled to evoke an emotional response in the first user 110.

The digital cinematic content 116 refers to an immersive audio-video content that is arranged at least in part by a script designed to entertain and evoke emotions in characters, such as the first user 110 and the one or more computer-controlled characters 112a and 112b, according to a scheme for narrative tension, referred to herein as the target emotional arc. The narrative tension planned by the target emotional arc may cause the characters to experience feelings of opposite polarity, e.g., fear and confidence or aversion and attraction at different times or in response to certain dramatic events, characters, objects, images, sounds, music, or other stimuli generated from the digital audio-video content. The intensity of these feelings often relates to the interest and pleasure the character gains from the experience and may also be planned by the target emotional arc as tension builds, climaxes, and is relieved. The characters of the digital cinematic content 116 naturally react during experience of the emotional arc by involuntarily exhibiting neurological or neurophysiological states in tension (e.g., positive or negative emotions sometimes called valence, and intensity, amplitude or strength of the response, sometimes called arousal). In various embodiments, the digital cinematic content 116 may be configured to support interactive features resembling video game features or may be devoid of interactive features except for responding to data indicative of neurological or neurophysiological states of the characters.

In operation, the content management system 102 may be configured to determine a focus on the one or more computer-controlled characters 112a and 112b that may appear in the digital cinematic content 116. In accordance with an embodiment, the content management system 102 may determine the focus based on the emotion indicators of the first user 110. The first user 110 may be actively interacting with at least the one or more computer-controlled characters 112a and 112b and other objects appearing in the digital cinematic content 116. The emotion indicators may be symbolic values that relate to an emotional arc. Such emotion indicators of the first user 110 may be determined in response to the receipt of sensor data from at least one sensor positioned to sense an involuntary response of the first user 110 while engaged with the digital cinematic content 116.

The content management system 102 may be further configured to infer a set of emotion indicators for each of the one or more computer-controlled characters 112a and 112b based on one or more criteria. The one or more criteria may include determining a semantics of the set of emotion indicators based on a social appraisal by a focus group (as a first criterion), an action, an inaction, or a body language of the one or more computer-controlled characters (as a second criterion), sentiments of the one or more computer-controlled characters (as a third criterion), emotive or emotional conjugation (as a fourth criterion), and arousal and valence values for the one or more computer-controlled characters (as a fifth criterion). Details about the one or more criteria and the set of emotion indicators are provided, for example, in FIG. 9.

The content management system 102 may be further configured to create multifactor feedback loops. The multifactor feedback loops may be based on the inferred set of emotions indicators of each of the one or more computer-controlled characters 112a and 112b. Based on one feedback loop, the content management system 102 may be configured to control at least a story line of the digital cinematic content 116. Accordingly, the content management system 102 may select a next scene in a narrative branch corresponding to the digital cinematic content 116 based on the target emotional arc of the first user 110 and the inferred set of emotion indicators for each of the one or more computer-controlled characters 112a and 112b for the controlled story line of the digital cinematic content 116.

Further, based on another loop, the content management system 102 may be configured to control behavioural characteristics of the one or more computer-controlled characters 112a and 112b. Accordingly, for the next scene, the content management system 102 may adjust the focus, emotional goals, and tactics of the one or more computer-controlled characters 112a and 112b for the controlled behavioural characteristics of the one or more computer-controlled characters 112a and 112b. Further, the content management system 102 may adjust next dialogues for the one or more computer-controlled characters 112a and 112b based on the adjusted focus, the adjusted emotional goals, and the adjusted tactics of the one or more computer-controlled characters 112a and 112b.

Furthermore, based on another loop, the content management system 102 may be configured to calculate a content engagement power (CEP) value for the digital cinematic content 116 based on the inferred set of emotion indicators of the one or more computer-controlled characters 112a and 112b and emotion indicators of the first user 110. Accordingly, the target emotional arc of the first user 110 may be achieved more effectively based on the multifactor feedback loops.

It should be noted that only three feedback loops are discussed herein for exemplary purposes. However, it should not be construed to be limiting and additional feedback loops may be realized for further improvement in achieving the target emotional arc of the first user 110, thereby developing a highly authentic, interactive, and collaborative immersive experience. Details about controlling the story line of the digital cinematic content 116 and behavioural characteristics of the one or more computer-controlled characters 112a and 112b are provided, for example, in FIG. 6 and FIG. 9.

Figure 2:
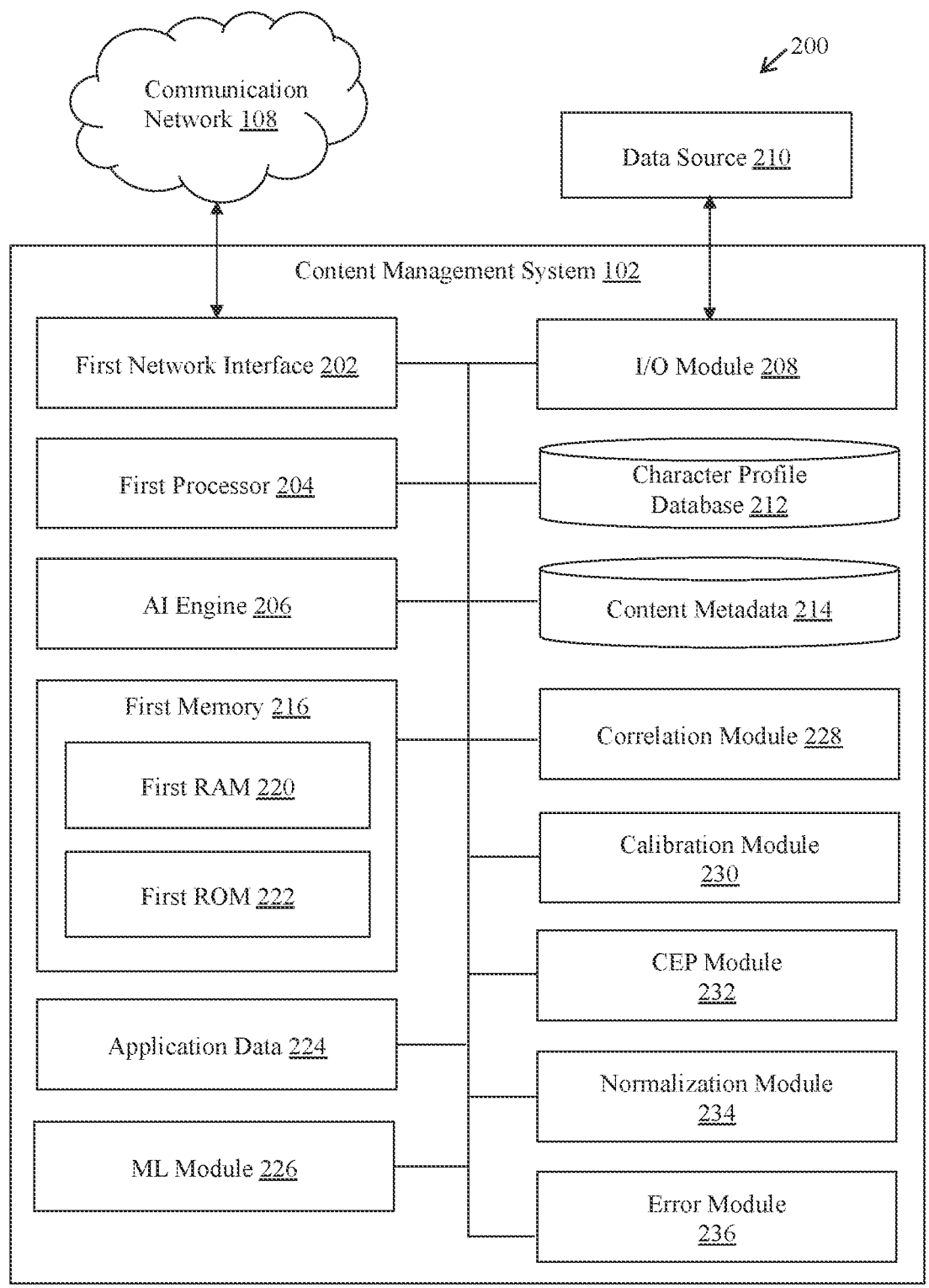
FIG. 2 is a block diagram that illustrates an exemplary content management system for controlling the digital cinematic content based on emotional state of characters, in accordance with various aspects and example implementations of the present disclosure.

FIG. 2 is a block diagram that illustrates an exemplary content management system for controlling the digital cinematic content based on emotional state of characters, in accordance with various aspects and example implementations of the present disclosure. FIG. 2 is explained in conjunction with elements from FIG. 1. With reference to FIG. 2, there is shown a block diagram 200 of the content management system 102. The content management system 102 may include a first network interface 202, a first processor 204, an AI engine 206, an I/O module 208, a data source 210, a character profile database 212, a content metadata 214, and a first memory 216. The first memory 216 may further include various modules, such as first RAM 220 and a first ROM 222. The first RAM 220 may further include application data 224, an ML module 226, a correlation module 228, a calibration module 230, a CEP module 232, a normalization module 234, and an error module 236.

The first network interface 202 may comprise suitable logic, circuitry, and interfaces that may be configured to facilitate a communication with different external devices, such as the client device 104 and the plurality of servers 106. The first network interface 202 may include a communication interface that may be configured to communicate wireless signals and wireless data received from the external electronic devices.

The first network interface 202 may include, for example, a wired/wireless headset port, an external-charger port, a wired/wireless data port, a memory card port, an audio input/output (I/O) port, a video I/O port, and an earphone port. In response to a connection between an external device and the first network interface 202, appropriate launches or corresponding drivers related to the connected external device may be performed.

The first network interface 202 may include a communication interface that may be configured to communicate wireless signals and wireless data received from the external electronic devices to the first processor 204. In accordance with various embodiments, the communication interface may include, for example a mobile communication module, a broadcast reception module, a wireless Internet module, a short-range communication module, and a location information module.

The mobile communication module may transmit and receive wireless signals to perform data communication with a base station, an external terminal, and/or a server over a mobile communication network. The mobile communication network may be established according to various communication methods, for example, the Global System for Mobile communication (GSM), code-division multiple access (CDMA), code-division multiple access 2000 (CDMA2000), Enhanced Voice-Data Optimized or Enhanced Voice-Data Only (EV-DO), WCDMA, High Speed Downlink Packet Access (HSDPA), High Speed Uplink Packet Access (HSUPA), Long Term Evolution (LTE), Long Term Evolution-Advanced (LTE-A), the fifth-generation (5G) technology standard (and all the successor technology standards, such as 6G, 7G, and beyond) for broadband cellular networks, and the like. The broadcast reception module may receive a broadcast signal and/or broadcast-related information from an external broadcast management server through a broadcast channel.

The wireless Internet module may transmit and receive wireless signals for data communication over a network according to wireless Internet technologies, for example, WLAN, Wi-Fi, Wi-Fi Direct, Digital Living Network Alliance (DLNA), wireless broadband (WiBro), World Interoperability for Microwave Access (WiMAX), HSDPA, HSUPA, LTE, LTE-A, 5G technology standard for broadband cellular networks, and the like. The short-range communication module may transmit and receive wireless signals for data communication over a limited range using various short-range communication technologies, for example, Bluetooth®, radio-frequency identification (RFID), Infrared Data Association (IrDA), ultra-wideband (UWB), ZigBee®, near-field communication (NFC), Wi-Fi, Wi-Fi Direct, Wireless Universal Serial Bus (Wireless USB) technologies, and the like. The location information module may determine the current location of the content management system 102 using various modules, such as a Global Positioning System (GPS) module or a Wi-Fi module.

The first processor 204 may include suitable logic, circuitry, and interfaces that may be configured to perform different operations based on executable program instructions stored in the first memory 216, recommendations predicted by the AI engine 206, or commands provided by the first user 110. For example, some of the operations may include, but are not limited to, determining the focus on one or more computer-controlled characters 112a and 112b, inferring the set of emotion indicators, creating the multifactor feedback loops, and controlling at least the story line of the digital cinematic content 116 and the behavioural characteristics of the one or more computer-controlled characters 112a and 112b.

The first processor 204 may include one or more specialized processing units, which may be implemented as an integrated processor or a cluster of processors that perform the functions of the one or more specialized processing units, collectively. The first processor 204 may be implemented based on a number of processor technologies known in the art. Examples of implementations of the first processor 204 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), matrix processors, digital signal processor (DSP), programmable logic device, programmable logic array (PLA), microcode, instruction set, emulated or virtual machine processor, or any similar device, combination of devices, or logic elements (hardware or software) that permit the execution of instructions.

The AI engine 206 may include suitable logic, circuitry, and interfaces that may be configured to perform specialized tasks and generate intelligent recommendations for the content management system 102 based on artificial neural networks, machine vision, deep learning, and machine learning modules. For example, the AI engine 206 may deploy AI-based algorithms, such as machine vision algorithms and the like, to estimate various poses or postures and extract visual features of each character and perform further analysis thereupon. In another example, the AI engine 206 may deploy AI-based computer vision techniques to enable tracking, efficient real-time computation and analysis on the various characters and objects in the digital cinematic content 116 being rendered at the client device 104. Such designs may take advantage of a known number of active characters within the digital cinematic content 116 and easily distinguishable color features of the characters, to simplify the character tracking and identification process, allowing the rendering of character and game analytics and the character annotation of the game video, in real-time. In yet another example, the AI engine 206, based on machine learning algorithms, may predict recommendations for dialogue and actions based on player profile and action in scene by the one or more computer-controlled characters 112a and 112b and also by interactions between the first user 110 and the one or more computer-controlled characters 112a and 112b. Further, the AI engine 206 may predict preferences of the first user 110 and may offer most relevant and optimal recommendations for branching at narrative forks of the digital cinematic content 116, based on emotion indicators of the first user 110, inferred set of emotion indicators of the one or more computer-controlled characters 112a and 112b, predictions of emotional responses, the targeted emotional arc for the first user 110 or cohort, and contextual indicators, such as dialogue with the one or more computer-controlled characters 112a and 112b or other player actors.

In an exemplary implementation, the AI engine 206 may be realized by merging AI in cloud computing. In such implementation, machine learning may be integrated in the cloud, referred to as intelligent cloud, for applying machine learning algorithms efficiently and in comparatively less time. However, it should be noted that the above exemplary implementation should not be construed to be limiting and other implementations may also be possible without any deviation from the scope of the disclosure.

The I/O module 208 may include suitable logic, circuitry, and interfaces that may be coupled via an I/O port to the data source 210 for sensor data indicative of emotional states and viewing history of at least the first user 110. The viewing history may include a log-level record of variances from a baseline script for a content package or equivalent record of control decisions made in response to player actor emotional states and other input. Viewing history may also include content viewed on TV, OTTs, and other sources and stored in the character profile database 212. The character profile database 212 may also include prior emotional response data, a demographic profile, emotional arc, arousal, and valence emoted by the first user 110 for one or more scenes in the digital cinematic content 116. Any source that contains a derived emotional arc may be useful for input to an emotional-reacting content control algorithm. Data pertaining to a target emotional arc and various other parameters, such as CEP related with the digital cinematic content 116 may be stored in the content metadata 214.

The first memory 216 may include suitable logic, circuitry, interfaces, and/or code that may be configured to store the program instructions to be executed by the first processor 204. The first memory 216 may store a number of application programs running on the content management system 102, operational data, and commands. The first memory 216 may store information and/or instructions for use in combination with the first processor 204. The first memory 216 may include volatile and non-volatile memory, such as the first RAM 220 and the first ROM 222, respectively. A number of program modules may be stored on the hard disk, external disk, the first ROM 222 or the first RAM 220, including an operating system (not shown), application data 224, and other program modules (not shown). The application data 224 may include at least a part of the functionality as described above. The first RAM 220 may be of any type, such as Static RAM (SRAM), Dynamic RAM (DRAM), or Synchronous Dynamic RAM (SDRAM). A basic input/output system (BIOS) containing the basic routines that helps to transfer information between elements within the content management system 102, such as during start-up, may be stored in the first ROM 222.

The application data 224 may correspond to application state data, including but not limited to, records of user interactions with an application or other application inputs, outputs or internal states. Applications may include software for control of the digital cinematic content 116 and supporting functions. Applications and data may be served from other types of servers, for example, any server accessing the distributed blockchain data structure 106e, or the P2P server 106d operating contemporaneously as micro-servers or clients. Examples of the applications may include sensor control and emotion detection applications.

The ML module 226 may include instructions that when executed by the first processor 204 may cause one or more of applying a machine learning process encoded in a computer language to data indicative of player actor emotional reactions thereby identifying an internal state of the first user 110 useful for a content control algorithm. The ML module 226 when executed by the first processor 204 may cause an assignment of a likelihood of a targeted outcome, for example, a defined emotional state targeted for the emotional arc of the digital cinematic content 116, for specific control actions.

The correlation module 228 may correlate biometric feedback to one or more metrics, such as arousal or valence. The correlation module 228 may include instructions that when executed by the first processor 204 may cause a correlation of biometric sensor data to one or more neurological (e.g., emotional) states of the first user 110, using machine learning (ML) or other processes.

The calibration module 230 may be configured to perform calibration for the sensor data pertaining to the first user 110 to calibrate user reactions to known stimuli, for example a known resting stimulus, a known arousing stimulus, a known positive valence stimulus, and a known negative valence stimulus.

The CEP module 232 may calculate a CEP value based on the sensor data and other output from upstream modules. Details of determining the CEP value are disclosed later herein in FIG. 10.

The normalization module 234 may include instructions that when executed by the first processor 204 cause a normalization of valence, arousal, or other values using a baseline input. Thus, the normalization module 234 may be configured to normalize the sensor data for genre differences, as different genres produce different valence and arousal scores.

The error module 236 may determine error vector and matrix of vectors for evaluation or control of the digital cinematic content 116. In other words, the error module 236 may save, increment, or otherwise accumulate an error vector value describing the error for one or more variables. The error vector may include a difference between the references arc and a measured response for each measured value (e.g., arousal and valence values) for a specified scene, time period, or set of video frames. Such error measurement may include or augment other metrics for evaluation of the digital cinematic content 116.

Figure 3:
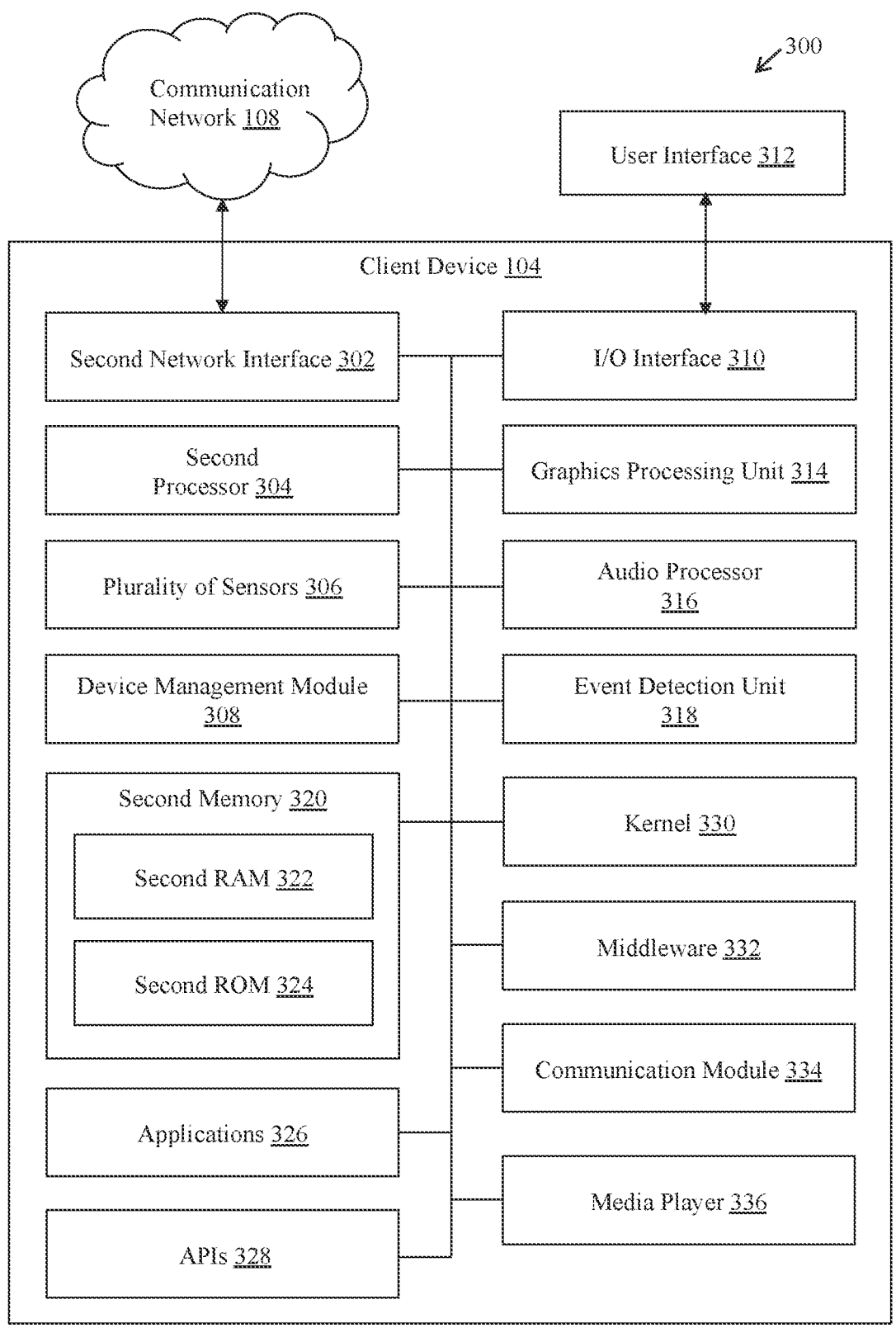
FIG. 3 is a block diagram that illustrates an exemplary client device for controlling the digital cinematic content based on emotional state of characters, in accordance with various aspects and example implementations of the present disclosure.

FIG. 3 is a block diagram that illustrates an exemplary client device for controlling the digital cinematic content based on emotional state of characters, in accordance with various aspects and example implementations of the present disclosure. FIG. 3 is explained in conjunction with elements from FIG. 1. With reference to FIG. 3, there is shown a block diagram 300 of the client device 104. The client device 104 may include a second network interface 302, a second processor 304, a plurality of sensors 306, a device management module 308, an I/O interface 310, a user interface 312, a graphics processing unit 314, an audio processor 316, an event detection unit 318, a second memory 320 (that includes applications 326, application programming interfaces (APIs) 328, kernel 330, and middleware 332), a communication module 334, and a media player module 336.

The second network interface 302 may comprise suitable logic, circuitry, and interfaces that may be configured to facilitate a communication with different external devices, such as the content management system 102 and the plurality of servers 106. The second network interface 302 may include a communication interface that may be configured to communicate wireless signals and wireless data received from the external electronic devices, systems, or servers.

The second network interface 302 may include, for example, a wired/wireless headset port, an external-charger port, a wired/wireless data port, a memory card port, an audio input/output (I/O) port, a video I/O port, and an earphone port. In response to a connection between an external device and the second network interface 302, appropriate launches or corresponding drivers related to the connected external device may be performed.

The second network interface 302 may include a communication interface that may be configured to communicate wireless signals and wireless data received from the external electronic devices to the second processor 304. In accordance with various embodiments, the communication interface may include, for example a mobile communication module, a broadcast reception module, a wireless Internet module, a short-range communication module, and a location information module.

The mobile communication module may transmit and receive wireless signals to perform data communication with a base station, an external terminal, and/or a server over a mobile communication network. The mobile communication network may be established according to various communication methods, for example, the Global System for Mobile communication (GSM), code-division multiple access (CDMA), code-division multiple access 2000 (CDMA2000), Enhanced Voice-Data Optimized or Enhanced Voice-Data Only (EV-DO), WCDMA, High Speed Downlink Packet Access (HSDPA), High Speed Uplink Packet Access (HSUPA), Long Term Evolution (LTE), Long Term Evolution-Advanced (LTE-A), the fifth-generation (5G) technology standard and all the successor technology standards, such as 6G, 7G, and beyond) for broadband cellular networks, and the like. The broadcast reception module may receive a broadcast signal and/or broadcast-related information from an external broadcast management server through a broadcast channel.

The wireless Internet module may transmit and receive wireless signals for data communication over a network according to wireless Internet technologies, for example, WLAN, Wi-Fi, Wi-Fi Direct, Digital Living Network Alliance (DLNA), wireless broadband (WiBro), World Interoperability for Microwave Access (WiMAX), HSDPA, HSUPA, LTE, LTE-A, 5G technology standard for broadband cellular networks, Internet of Things (IoT) and the like. The short-range communication module may transmit and receive wireless signals for data communication over a limited range using various short-range communication technologies, for example, Bluetooth®, radio-frequency identification (RFID), Infrared Data Association (IrDA), ultra-wideband (UWB), ZigBee®, near-field communication (NFC), Wi-Fi, Wi-Fi Direct, Wireless Universal Serial Bus (Wireless USB) technologies, and the like. The location information module may determine the current location of the client device 104 using various modules, such as a Global Positioning System (GPS) module or a Wi-Fi module.

The second processor 304 may include suitable logic, circuitry, and interfaces that may be configured to perform different operations based on executable program instructions stored in the second memory 320, sensor data sensed by the plurality of sensors 306, recommendations predicted by the AI engine 206, or commands provided by the first user 110. Examples of such operations may include reception of the digital cinematic content 116 from the content management system 102 or the plurality of servers 106 and rendering the received digital cinematic content 116.

The second processor 304 may include one or more specialized processing units, which may be implemented as an integrated processor or a cluster of processors that perform the functions of the one or more specialized processing units, collectively. The second processor 304 may be implemented based on a number of processor technologies known in the art. Examples of implementations of the second processor 304 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), matrix processors, digital signal processor (DSP), programmable logic device, programmable logic array (PLA), microcode, instruction set, emulated or virtual machine processor, or any similar device, combination of devices, or logic elements (hardware or software) that permit the execution of instructions.

The plurality of sensors 306 may comprise suitable logic, circuitry, and interfaces that may be configured to detect (or sense) an involuntary response of the first user 110 while engaged with the digital cinematic content 116 and the surrounding environment around the avatar 110a in the digital cinematic content 116. The plurality of sensors 306 may be integrated within or coupled with the client device 104. Each of the plurality of sensors 306 may capture sensor data associated with one or more biological parameters of the first user 110. The captured data may be further used to determine an emotional indication of the first user 110.

The plurality of sensors 306 may include generic sensors, such as a proximity sensor, a touch sensor, an illuminance sensor, an acceleration sensor, a magnetic sensor, a gravity sensor, a gyroscope sensor, a motion sensor, an RGB sensor, an infrared sensor, an ultrasonic sensor, and a battery gauge. The plurality of sensors 306 may further include biometric sensors, such as retina scanner, fingerprint and thumbprint scan sensor, optical scanner, the microphone, to detect eye tracking sensors, biometric data of the first user 110. Non-limiting examples of the biometric sensors may include, galvanic skin response (GSR) sensor, a facial electromyography (fEMG) sensor, a video facial action unit (FAU) sensor, a brain machine interface (BMI) sensor, a video pulse detection (VPD) sensor, a pupil dilation sensor, a body chemical sensor, a functional magnetic imaging (fMRI) sensor, a photoplethysmography (PPG) sensor, phased-array radar (PAR) sensor, or a functional near-infrared data (fNIR) sensor. Details about each of the plurality of sensors are known in the art and have been omitted in this disclosure for the sake of brevity.

The device management module 308 may be configured to perform an operation to capture one or more events in a real-world environment and an operation to present information corresponding to the captured one or more events on the display unit via the I/O interface 310.

The I/O interface 310 may receive commands or data from the first user 110 through various input devices. For example, the I/O interface 310 may receive sensor data from the plurality of sensors 306. In another example, the I/O interface 310 may receive commands from dual-hand controllers wirelessly coupled to the main unit, such as an AR/VR/Mixed reality headset or an immersive display device, of the client device 104. In another example, the I/O interface 310 may receive voice commands from a microphone to control various functionalities, such as volume control, pause, and play of the digital cinematic content 116 being rendered at the client device 104. Other examples may include, but are not limited to, a touch input unit (or touch controllers, such as trackpads) and a mechanical input unit (or a mechanical key, for example, a thumbstick, a button, a dome switch, a jog wheel, a jog switch, and the like located at the handheld controllers communicatively coupled with the main unit of the client device 104).

The I/O interface 310 may communicate the received commands or data to other components of the client device 104, such as the second processor 304, the device management module 308, the event detection unit 318, and the second memory 320. The second processor 304 may further transmit such data to the content management system 102 via the second network interface 302.

The I/O interface 310 may further output commands or data received from the second processor 304, the device management module 308, the event detection unit 318, and the second memory 320 to various output devices (for example, a speaker or a display unit). For example, the I/O interface 310 may output voice data processed by the second processor 304 to the first user 110 through the speaker. Examples of the speaker may include, but not limited to a set of internal speakers, a wireless speaker, a smart speaker, a wired speaker, a woofer, a sub-woofer, a tweeter, a sound bar, a loudspeaker, an optical audio device, and the like.

In another example, the I/O interface 310 may render the digital cinematic content 116 on the display unit. The display unit may further present screen information of an application program being executed on the client device 104, or User Interface and Graphic User Interface information according to the execution-screen information. Examples of the display unit may include, but not limited to, a light emitting diode (LED) display, an organic LED (OLED) display, a liquid crystal display (LCD), a plasma cell display, an electronic ink array display, a flexible LCD, a flexible electro-chromic display, an electronic paper display, and a flexible electro wetting display. Numerous other examples of the output unit may include a haptic unit, an optical unit, and the like.

The user interface 312 may correspond to a display device that may be coupled to the second processor 304 for providing user control input to a process for controlling output of the digital cinematic content 116 responsive to sensor data indicating an emotional state of the first user 110. The user control input may include, for example, selections from a graphical user interface or other textual or direct command generated via a touch screen, keyboard, pointing device, microphone, motion sensor, camera, or some combination of these or other input devices.

The graphics processing unit 314 may be a specialized processor designed to accelerate graphics rendering. The graphics processing unit 314 may process many pieces of data simultaneously, making them useful for machine learning, video editing, and gaming applications. The graphics processing unit 314, either integrated in the second processor 304 or in a separate chip, may provide video output (driven by a mixed reality display engine operating on the second processor 304, or other application for coordinating user inputs with an immersive content display and/or generating the display) to the display unit, which further outputs as a video display to the first user 110.

The audio processor 316 may be configured to receive an analog audio signal from an output device, such as a microphone, and convert it to a digital signal for processing by the second processor 304. The microphone may be used as a sensor for detection of emotional state and as a device for user input of verbal commands, or for social verbal responses to the one or more computer-controlled characters 112a and 112b or other player actors.

Further, an amplifier/speaker or other audio output transducer may be coupled to the second processor 304 via the audio processor 316. Audio output correlated to the video output and generated by the media player module 336, cinematic content control engine or other application may be provided to the audio transducer and output as audible sound to the first user 110.

The event detection unit 318 may include functions for detecting events based on a measure or indicator of one or more of the plurality of sensors 306 exceeding a data threshold. For example, an event may be the first user 110 (wearing a VR headset as a form factor of the client device 104) moving his head in vertically downward direction with respect to the ground surface or providing a gesture using dual-hand controllers. The plurality of sensors 306 may sense the directional movement and speed associated with such movements as an event and interpret the corresponding commands based on pre-stored set of rules in a database.

The second memory 320 may include suitable logic, circuitry, interfaces, and/or code that may be configured to store the program instructions to be executed by the second processor 304. The second memory 320 may include volatile and non-volatile memory, such as the second RAM 322 and the second ROM 324, respectively. The second RAM 322 may be of any type, such as Static RAM (SRAM), Dynamic RAM (DRAM), or Synchronous Dynamic RAM (SDRAM). A basic input/output system (BIOS) containing the basic routines that helps to transfer information between elements within the client device 104, such as during start-up, may be stored in the second ROM 324.

As illustrated in FIG. 3, the second memory 320 may further include applications 326, APIs 328, kernel 330, and middleware 332. The second memory 320 may also store additional instructions, for example an operating system, and supporting modules associated with the client device 104. Each of the foregoing programming modules may include software, firmware, hardware, or a combination of at least two of software, firmware, and hardware.

The applications 326 may include an application designated in the client device 104 or an application received from another electronic device, such as one of the plurality of servers 106.

Each of the APIs 328 may be an interface that may control functions that the applications 326 provide at the kernel 330 or the middleware 332. For example, the APIs 328 may include at least one interface or function (for example, a command) for file control, window control, video processing, or text control.

The kernel 330 may control or manage system resources that may be used in executing operations or functions implemented in other programming modules, such as the middleware 332, the APIs 328, or the applications 326. Further, the kernel 330 may provide an interface for allowing the middleware 332, the APIs 328, or the applications 326 to access and control or manage individual components of the client device 104.

The middleware 332 may be a medium through which the kernel 330 may communicate with the APIs 328 or the applications 326 to transmit and receive data. Further, the middleware 332 may perform control operations, such as scheduling or load balancing, regarding work requests by one or more applications 326. The control operations may be performed by assigning priorities for using system resources (i.e., the second processor 304 and/or the second memory 320) of the client device 104.

The communication module 334 may handle application-level communication needs and lower-level communications protocols, preferably without requiring user management.

The media player module 336 may be configured to generate video output based on correlation with audio output of the digital cinematic content 116. Program instructions may be grouped into functional modules, i.e., the communication module 334 and the media player module 336, to facilitate coding efficiency and comprehensibility. The media player module 336 calibrates itself for use by the first user 110 based on training of a machine learning algorithm, taking baseline measurements, downloading available calibration data from the plurality of servers 106 for use in a session with the first user 110, or another customization.

Figure 4:
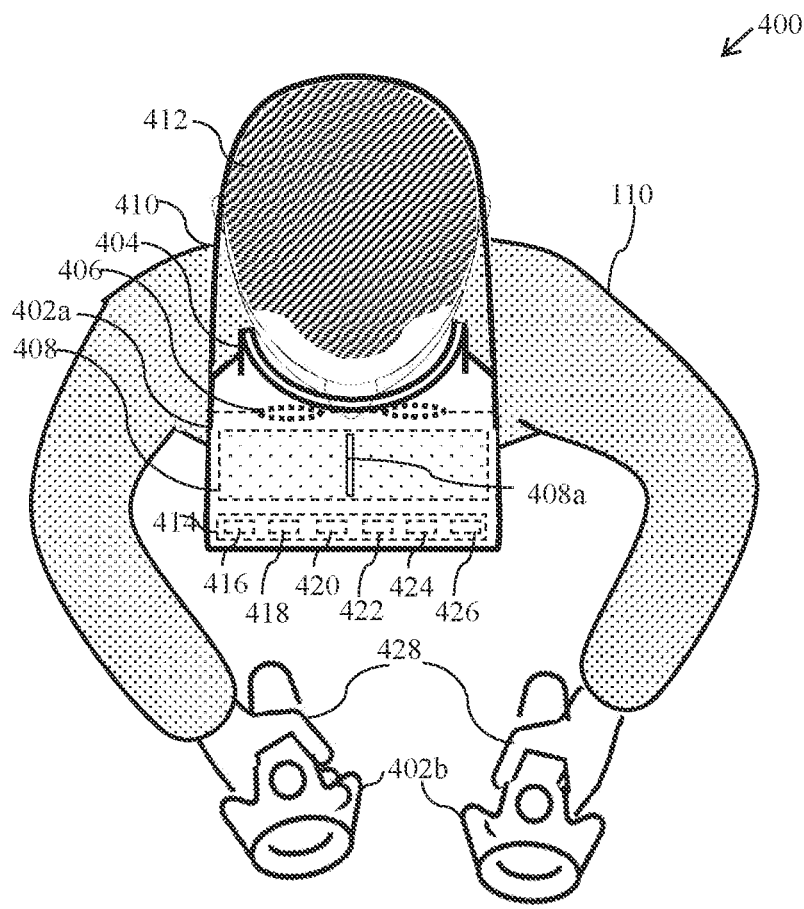
FIG. 4 is a diagram that illustrates an exemplary immersive VR stereoscopic display device for controlling the digital cinematic content based on emotional state of characters, in accordance with various aspects and example implementations of the present disclosure.

FIG. 4 is a diagram that illustrates an exemplary immersive VR stereoscopic display device for controlling the digital cinematic content based on emotional state of characters, in accordance with various aspects and example implementations of the present disclosure. FIG. 4 is explained in conjunction with elements from FIG. 1 and FIG. 3. With reference to FIG. 4, there is shown an immersive VR stereoscopic display device 400 which may be an exemplary embodiment of the client device 104, as described in FIG. 3. The client device 104 may be provided in various form factors, of which the immersive VR stereoscopic display device 400 provides one example. The innovative methods, apparatus and systems described herein are not limited to a single form factor but may be used in any video output device suitable for output of the digital cinematic content 116. As used herein, the digital cinematic content 116 includes any digital signal that produces audio-video output according to a script or narrative, which may be branching and interactive. In an aspect, the digital cinematic content 116 may vary in response to a detected emotion indicators of the first user 110 and the inferred set of emotion indicators of the one or more computer-controlled characters 112a and 112b.

The immersive VR stereoscopic display device 400 may comprise a VR headset 402a and handheld controllers 402b. The VR headset 402a may include a tablet support structure that may be made of an opaque lightweight structural material (e.g., a rigid polymer, aluminum or cardboard) configured for supporting and allowing for removable placement of a portable tablet computing or smartphone device including a high-resolution display screen, for example, an LCD display. The immersive VR stereoscopic display device 400 may be designed to be worn close to the face of the first user 110, enabling a wide field of view using a small screen size such as in a smartphone. The support structure 404 holds a pair of lenses 406 in relation to the display screen 408. The pair of lenses 406 may be configured to enable the first user 110 to comfortably focus on the display screen 408 which may be held approximately one to three inches from the eyes of the first user 110.

The immersive VR stereoscopic display device 400 may further include a viewing shroud (not shown) coupled to the support structure 404 and configured of a soft, flexible or other suitable opaque material for form fitting to the face of the first user 110 and block outside light. The shroud may be configured to ensure that the only visible light source to the first user 110 is the display screen 408, enhancing the immersive effect of using the immersive VR stereoscopic display device 400. A screen divider 408a may be used to separate the display screen 408 into independently driven stereoscopic regions, each of which is visible only through a corresponding one of the pair of lenses 406. Hence, the immersive VR stereoscopic display device 400 may be used to provide stereoscopic display output, providing a more realistic perception of 3D space for the first user 110.

The immersive VR stereoscopic display device 400 may further include a bridge (not shown) for positioning over the nose of the first user 110, to facilitate accurate positioning of the pair of lenses 406 with respect to the eyes of the first user 110. The immersive VR stereoscopic display device 400 may further comprise an elastic strap or band 410, or other headwear for fitting around a head 412 of the first user 110 and holding the immersive VR stereoscopic display device 400 firmly to the head 412 of the first user 110.

The immersive VR stereoscopic display device 400 may further include additional electronic components of a display and communications unit 414 (e.g., a tablet computer or smartphone) in relation to the head 412 of the first user 110. When wearing the support structure 404, the first user 110 may view the display screen 408 though the pair of lenses 406. The display screen 408 may be driven by the CPU 416 and/or a GPU 418 via an internal communication bus (not shown). Components of the display and communications unit 414 may further include, for example, a transmit/receive component 420, enabling wireless communication between the CPU 416 and an external server, such as one or more of the plurality of servers 106, via a wireless coupling. The transmit/receive component 420 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component 420 may enable streaming of video data to the display and communications unit 414 from a local or remote video server, and uplink transmission of sensor and other data to the local or remote video server for control or audience response techniques as described herein.

Components of the display and communications unit 414 may further include, for example, one or more sensors 422 coupled to the CPU 416 via the internal bus. Such sensors may include, for example, an accelerometer/inclinometer array providing orientation data for indicating an orientation of the display and communications unit 414. As the display and communications unit 414 may be fixed to the head 412 of the first user 110, this data may also be calibrated to indicate an orientation of the head 412. The one or more sensors 422 may further include, for example, a Global Positioning System (GPS) sensor indicating a geographic position of the first user 110. The one or more sensors 422 may further include, for example, a camera or image sensor positioned to detect an orientation of one or more of the eyes of the first user 110, or to capture video images of the physical environment of the first user 110 (for VR mixed reality), or both. In some embodiments, a camera, image sensor, or other sensor configured to detect the eyes or eye movements of the first user 110 and may be mounted in the support structure 404 and coupled to the CPU 416 via the internal bus and a serial bus port (not shown), for example, a Universal Serial Bus (USB) or other suitable communications port. The one or more sensors 422 may further include, for example, an interferometer positioned in the support structure 404 and configured to indicate a surface contour to the eyes of the first user 110. The one or more sensors 422 may further include, for example, a microphone, array or microphones, or other audio input transducer for detecting spoken user commands or verbal and non-verbal audible reactions to display output. The one or more sensors 422 may include, for example, electrodes or microphone to sense heart rate, a temperature sensor configured for sensing skin or body temperature of the first user 110, an image sensor coupled to an analysis module to detect facial expression or pupil dilation, a microphone to detect verbal and nonverbal utterances, or other biometric sensors for collecting biofeedback data including nervous system responses capable of indicating emotion via algorithmic processing.

Components of the display and communications unit 414 may further include, for example, an audio output transducer 424, for example a speaker or piezoelectric transducer in the display and communications unit 414 or audio output port for headphones or other audio output transducer mounted in the VR headset 402a or the like. The audio output transducer 424 may provide surround sound, multichannel audio, so-called 'object-oriented audio', or other audio track output accompanying the stereoscopic immersive VR video display content.

Components of the display and communications unit 414 may further include, for example, a memory 426 coupled to the CPU 416 via a memory bus. The memory 426 may also store data, for example, audio-video data in a library or buffered during streaming from a network node.

The handheld controllers 402b may be configured to register the hand and finger movements of the first user 110 in a virtual environment. The handheld controllers 402b may convert the physical, kind of mechanic movements of the hands 428 (and/or body) of the first user 110 into digital movements inside the virtual environment. The handheld controllers 402b may be having various characteristics, such as tracking precision, superior build quality, ergonomics, long battery life, and high degree of freedom.

The handheld controllers 402b may be equipped with a set of buttons, triggers, and typically a thumb stick that allow the first user 110 to grab, push, throw, and move around virtual objects as various events. For example, pressing a trigger button on the handheld controllers 402b may translate into pulling a trigger of a virtual gun whereas using a thumb stick may help the first user 110 walk in a virtual world.

The handheld controllers 402b may be configured to track the hand movements of the first user 110 based on various techniques, such as a lighthouse tracking and an inside-out tracking. It should be noted that the above examples should not be construed to be limiting and other techniques may also be deployed to track the hand movements of the first user 110 holding the handheld controllers 402b.

Figure 5:
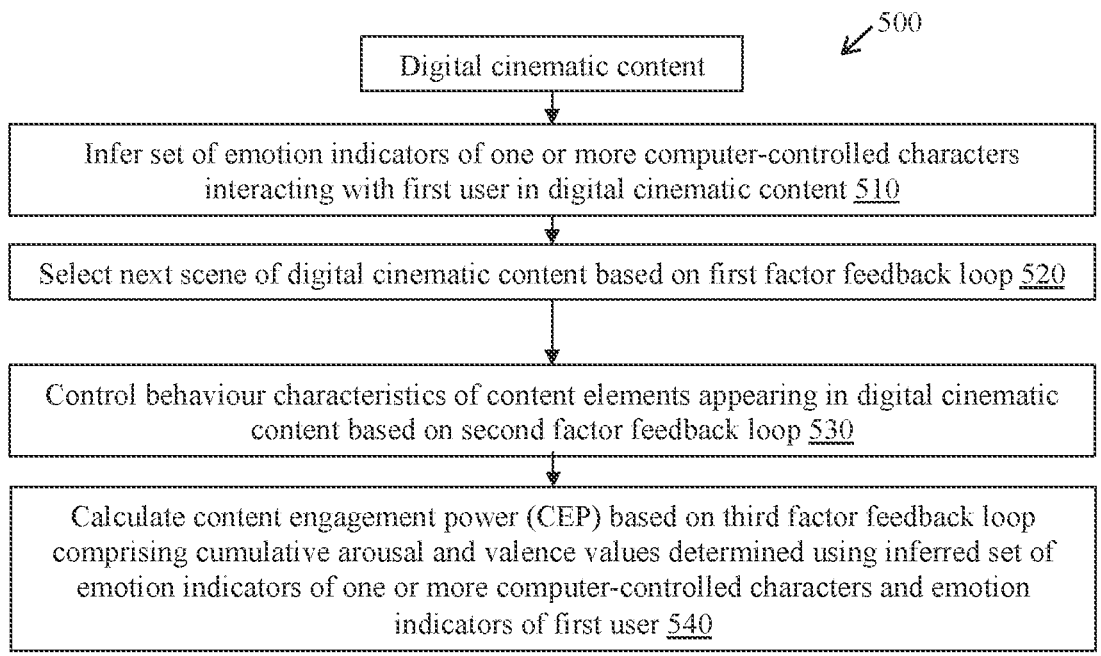
FIG. 5 is an overview of exemplary methods including four related operations in any functional order or in parallel for controlling digital cinematic content based on emotional state of characters, in accordance with various aspects and example implementations of the present disclosure.

FIG. 5 is an overview of exemplary methods 500 including four related operations in any functional order or in parallel for controlling digital cinematic content based on emotional state of characters, in accordance with various aspects and example implementations of the present disclosure. FIG. 5 is explained in conjunction with elements from FIG. 1 to FIG. 4.

An emotion indicator inferring operation 510 may use a machine learning algorithm for inferring a set of emotion indicators of the one or more computer-controlled characters 112a and 112b interacting with the first user 110 in the digital cinematic content 116. The set of emotion indicators of the one or more computer-controlled characters 112a and 112b may be inferred along with or post the determination of emotion indicators of the first user 110. Optionally, the machine learning algorithm may be configured to process contextual data, such as, user location, user position, time-of-day, day-of-week, ambient light level, and ambient noise level, that may improve the accuracy in determining the inferred set of emotion indicators (of the one or more computer-controlled characters 112a and 112b) and emotion indicators (of the first user 110).

In general, an emotion indicator may be a symbolic value that relates to an emotional arc. The emotion indicator may have quantitative or non-quantitative constituent elements. For example, an emotion indicator of the first user 110 may be designed as a multi-dimensional vector with values representing intensity of psychological qualities, such as cognitive load, arousal, and valence. Valence may correspond to a state of attractiveness or desirability of an event, object or situation. Valence may be positive when a subject feels something is good or attractive and negative when the subject feels the object is repellant or bad. Arousal may correspond to a state of alertness and attentiveness of the subject. The machine learning algorithms may include at least one supervised machine learning (SML) algorithm in which labelled datasets, as training data, are used to train algorithms, and accordingly data is classified and or outcome is predicted accurately. Examples of the SML algorithm may include, but are not limited to, a decision tree algorithm, linear regression algorithm, logistic regression algorithm, a neural network algorithm, a support vector algorithm, a Gaussian naïve Bayes algorithm, a linear classification module, and a random forest algorithm.

A next scene selection operation 520 may select the next scene of the digital cinematic content 116 based on a feedback loop comprising the emotion indicators and the inferred set of emotion indicators, and a targeted emotional arc for the first user 110. Predictions may be made using machine learning tools to predict narrative elements likely to produce a targeted emotional state in the first user 110 or cohort. Once predicted, a branch may be selected having the combination of elements scored as most likely to produce the targeted emotional response. In addition, the branching decision may be based on partly a direct input of the first user 110 in a manner resembling an interactive video game, by weighing direct input together with emotion indicators. Direct user input may include, for example, spoken or texted verbal input, input from a game controller, such as the handheld controllers 402b, bodily movement detected by a camera array, or selection of control links in a user interface. Further, the branching decision may be based partly on contextual indicators, such as dialogue between the one or more computer-controlled characters 112a and 112b, the first user 110, and other player actors in the virtual environment.

A content element control operation 530 may control behavioural characteristics of content elements, such as the computer-controlled characters, objects, or environments appearing in the digital cinematic content 116 based on another feedback loop comprising the emotion indicators and the inferred set of emotion indicators and previously selected scene of the digital cinematic content 116. The controlled content elements may exhibit predicted responses to changes and weighed emotional inputs with user inputs.

A CEP calculation operation 540 may calculate the CEP value of the digital cinematic content 116 based on another feedback loop comprising the cumulative arousal and valence values which may be determined using the inferred set of emotion indicators of the one or more computer-controlled characters 112a and 112b and the emotion indicators of the first user 110. Said differently, the CEP value may be calculated based on a ratio of a sum of the event powers to the expectation power for a comparable event in corresponding genre of the digital cinematic content 116, as described hereinafter in detail in FIG. 10. Such feedback loops catering to different factors, such as story line, behavioural characteristics, and CEP values, may be collectively termed as multifactor feedback loops.

Figure 6:
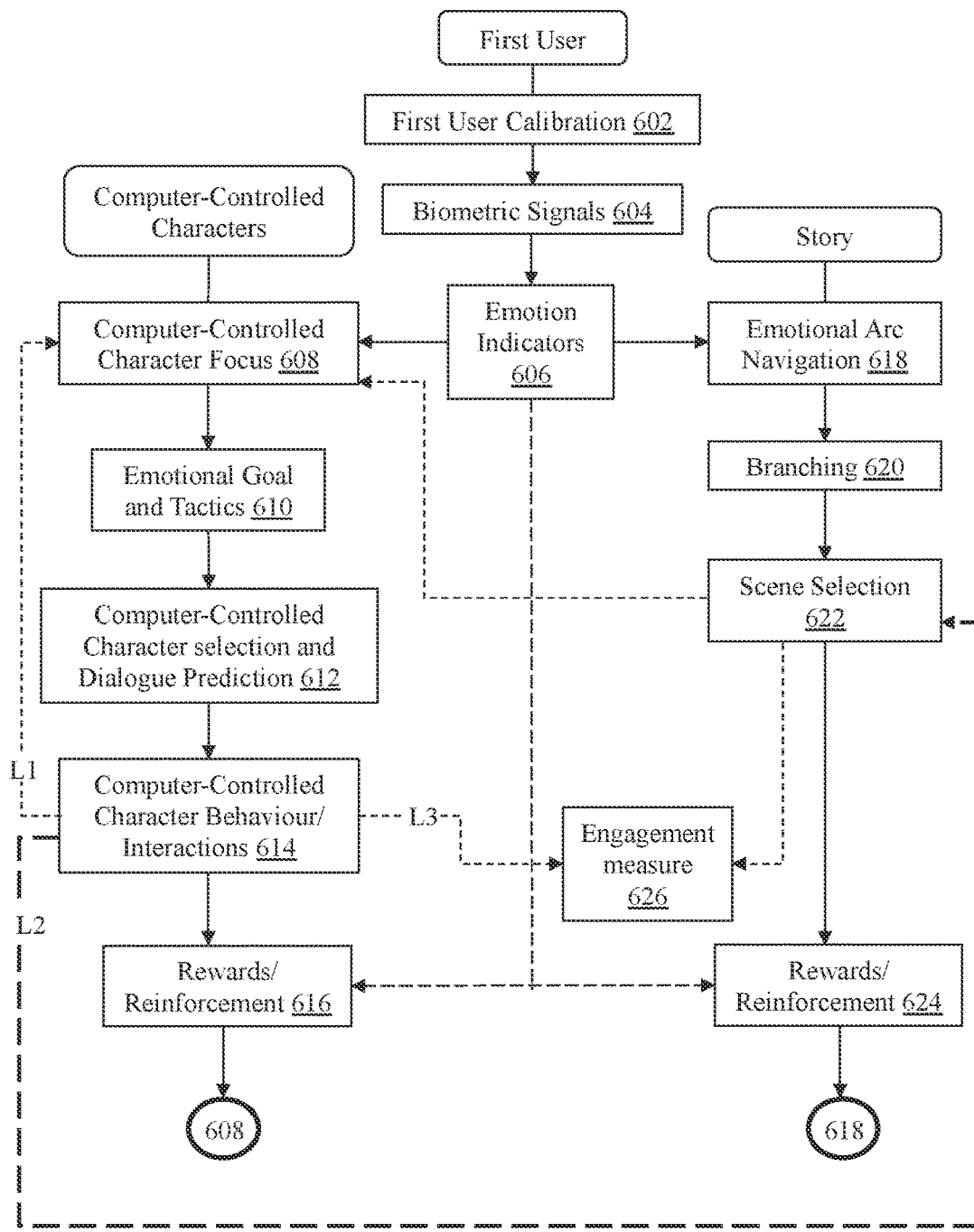
FIG. 6 is a flow diagram showing aspects of a method for controlling output of digital cinematic content based on emotional state of characters, in accordance with various aspects and example implementations of the present disclosure.

FIG. 6 is a flow diagram showing aspects of a method for controlling output of digital cinematic content based on emotional state of characters, in accordance with various aspects and example implementations of the present disclosure. FIG. 6 is explained in conjunction with elements from FIG. 1 to FIG. 5. FIG. 6 shows aspects of a method 600 for controlling output of digital cinematic content based on emotional state of characters, using multifactor feedback loops. It should be noted that the various operations, as described herein, may be executed partly by the client device 104 and the content management system 102 according to a collaborative model, or solely by one of the client device 104 or the content management system 102, in accordance with different implementations, without any deviation from the scope of the disclosure.

At 602, the media player module 336 may calibrate itself for use by the first user 110 based on training of a machine learning algorithm, taking baseline measurements, downloading available calibration data from the plurality of servers 106 for use in a session with the first user 110, or another customization. In an aspect, the calibration by the media player module 336, alone or in cooperation with one or more AI servers, may unobtrusively occur continuously or at intervals and gradually improve with time as the content management system 102 builds a more accurate emotional profile of the first user 110. In accordance with an embodiment, the calibration may be performed by the calibration module 230 of the content management system 102.

In addition to sensor calibration, the calibration system may also normalize biometric data between the first user 110 and the one or more computer-controlled characters 112a and 112b to establish a baseline for comparing biometric responses between the first user 110 and the one or more computer-controlled characters 112a and 112b. An additional content expectation normalization may also be measured to quantify player expectation of digital cinematic content 116. This process may include the measurement of biometric responses while under representative stimulus content. The calibration used together with normalization, may provide a robust baseline methodology for computing both singular and aggregate biometric responses between the first user 110 and the one or more computer-controlled characters 112a and 112b. The calibration and normalization factors may be used to compute emotional responses and engagement of the first user 110 with the digital cinematic content 116.

At 604, the media player module 336 may begin playing the digital cinematic content 116 and the first user 110 may begin viewing it while the plurality of sensors 306 may begin detecting biometric signals used for determining emotion indicators. Biometric sensors from the plurality of sensors 306 may be used to detect the biometric signals known in medical fields and may be adapted for sensing in the present disclosure. In an embodiment, the plurality of sensors 306 may include a motion sensor (e.g., an accelerometer), a position sensor, a touch (pressure) sensor, an altimeter, a location sensor (for example, a Global Positioning System (GPS), a proximity sensor, a smoke or vapour detector, a gyroscopic position sensor, a radio receiver, a multi-camera tracking sensor/controller, an eye-tracking sensor, a microphone or a microphone array, and optical sensors (e.g., a camera or camera array (such as stereoscopic array)) that detect body language, facial expressions, gaze direction and corneal deformation, brain-computer interface (BCI) signals that directly connect an enhanced brain with a coupled machined (e.g., the media player module 336 or an intermediate machine) with or without bidirectional communication capability between the brain and the coupled machine. The biometric sensors from the plurality of sensors 306 may include a biometric temperature or pulse sensor, an electroencephalographic (EEG) sensor, a galvanic skin response (GSR) sensor, a facial electromyography (fEMG) sensor, an electrocardiogram (EKG) sensor, a video facial action unit (FAU) sensor, a brain machine interface (BMI) sensor, a video pulse detection (VPD) sensor, a pupil dilation sensor, a body chemical sensor, a functional magnetic imaging (fMRI) sensor, a photoplethysmography (PPG) sensor, a functional near-infrared data (fNIR) sensor, and the like.

At 606, one of the media player module 336 or the content management system 102 may digitize and process the sensor data to derive symbolic emotion indicators that may be correlated by a story-telling software to emotional targets of a story arc. In accordance with an embodiment, the machine learning/AI tools, such as the AI engine 206 in conjunction with the ML module 226 in the content management system 102, may be used to receive the sensor data of the first user 110 from the client device 104, process the sensor data, and derive the emotion indicators in real time.

The emotion indicators may include quantitative measures of symbolized emotional qualities in a compact form. For example, a 64-bit machine-readable value is capable of conveying a value of 21 different emotional qualities in a scale from zero to eight, in which the identity of the quality is conveyed by bit position of its value. For example, the first three bits may indicate a happiness value, the second three bits a tension value, and so forth.

At 608, a processor of the media player module 336 may determine a focus on one or more computer-controlled characters 112a and 112b based on emotion indicators of the first user 110 and emotional impact scores of all the computer-controlled characters and a current scene identifier. The first processor 204 may issue a database query to retrieve all computer-controlled character identifiers that the content designers have associated with the current scene and determine a current emotional state of the first user 110.

Each computer-controlled character may be associated with a predetermined emotional impact score, which may be generic or customized for the first user 110. For example, a young child computer-controlled character might be scored high on a generic sympathy scale and low on a sympathy scale customized for the first user 110 who has an aversion to children. In another embodiment, a computer-controlled character may be associated with a dynamic emotional impact score that may be based on the inferred set of emotion indicators of the corresponding computer-controlled character.

In an embodiment, emotional impact score may be a predictive value based on experience of the content designer and/or empirical data. When well-crafted, an emotional impact score of a computer-controlled character may predict the emotional reactions the computer-controlled character is most likely to evoke in the first user 110 and other computer-controlled characters in the virtual environment. For example, a cute child computer-controlled character may score high on sympathy and low on fear. Each computer-controlled character may be associated with one or more tactics, such as confrontation, reassurance, or the like, suitable for its emotional profile.

At 610, the processor of the media player module 336 may determine emotional goals and tactics for the first user 110. Based on the emotional indicator of the first user 110, the processor may set goals based on a comparison of the current value of the emotion indicator with a targeted value and determine an error. For example, in a scenario, the target value of the emotion indicator of the first user 110 is suspense, however the current emotion indicator value indicates that the first user 110 is bored. Accordingly, the processor may set a goal of moving the first user 110 from boredom to suspense. In accordance with an embodiment, the emotional goals and tactics for the first user 110 may be determined by the AI engine 206 in conjunction with the ML module 226 of the content management system 102.

At 612, the processor of the media player module 336 may select the one or more computer-controlled characters 112a and 112b and predicts dialogues to be spoken by the one or more computer-controlled characters 112a and 112b. Alternatively, the process may select different tactics for the one or more computer-controlled characters 112a and 112b to follow, which may be associated with different scripts. The selection of the one or more computer-controlled characters 112a and 112b may be based on corresponding emotional impact profiles that score highly for transforming boredom into suspense for the first user 110, and dialogues that score highly in the same category. In accordance with an embodiment, the dialogues may be predicted by the AI engine 206 in conjunction with the ML module 226 of the content management system 102.

At 614, the processor may operate the selected one or more computer-controlled characters 112a and 112b according to the predicted dialogues. The computer-controlled character behaviour/interactions with the first user 110 and other computer-controlled characters may be recorded based on the predicted dialogues. In an aspect, the computer-controlled character behaviour/interactions with the first user 110 and other computer-controlled characters may be analysed based on the predicted dialogues that are most likely able to correct the deviation of the first user 110 from the targeted arc. If the predicted dialogues fail, or based on random or quasi-random factors, the processor may operate an experimental set of dialogues. Experimental set of dialogues tests the response of the first user 110 to untried circumstance. Such set of dialogues may be useful to avoid the boredom of the first user 110 with repeated dialogues or themes, or when predicted response data is lacking. In accordance with an embodiment, the selected one or more computer-controlled characters 112a and 112b may be operated by the AI engine 206 in conjunction with the ML module 226 of the content management system 102.

In an embodiment, the control passes to block 608 as a first factor feedback loop 'L1'. Consequently, the behaviour of the one or more computer-controlled characters 112a and 112b and selection of characters from a plurality of computer-controlled characters may be controlled to achieve a target emotional arc of the first user 110.

In another embodiment, the control passes to block 622 as a second factor feedback loop 'L2' for influencing the next scene selection of the digital cinematic content 116.

In yet another embodiment, the control passes to block 626 as a third factor feedback loop 'L3'. At 626, the processor may determine engagement measure of the digital cinematic content 116 based on the selected characters from a plurality of computer-controlled characters and corresponding behaviour or interaction with other characters in the virtual environment, which ultimately facilitates to achieve the target emotional arc of the first user 110. In accordance with an embodiment, the engagement measure may correspond to determining the CEP value for the digital cinematic content 116, which is further described hereinafter in FIG. 10. In accordance with an embodiment, the CEP value may be determined by the CEP module 232 of the content management system 102.

At 616, the processor may record the emotional effect of the one or more computer-controlled characters 112a and 112b and dialogues in the relevant data structures used for training the AI algorithms responsible for the computer-controlled character and dialogue selection. Successes and failures thereby become new data for use in improving the future effectiveness of the method 600 in using computer-controlled character interaction to nudge the first user 110 towards the target emotional arc. If the nudging is unsuccessful, the process may select and implement a different computer-controlled character, tactic, or dialogues at any point when the emotional sensor data indicates that the targeted reaction is not being elicited from the first user 110. Control passes back to block 608.

At 618, the processor may compare the current emotional indicator of the first user 110 to a target emotional arc defined in digital data for the story.

At 620, the processor may select a narrative branch based on predictive AI for the first user 110. The AI may predict which narrative branch is most likely to result in the first user 110 experiencing the director's or target emotional arc, based on an emotional impact score for the branch, which may be an aggregate of emotional impact scores for the scenes that the branch contains. In accordance with an embodiment, the narrative branch may be selected by the AI engine 206 in conjunction with the ML module 226 of the content management system 102.

In accordance with an embodiment, the narrative branching operation may select destination branches at narrative forks of the digital cinematic content 116, based on emotion indicators of the first user 110, predictions of emotional response, and the targeted emotional arc for the first user 110. A participating control node may make predictions using machine learning tools to predict narrative elements likely to produce a targeted emotional state in the first user 110. Once making the prediction, the control node may select the narrative branch having the combination of elements scored as most likely to produce the targeted emotional response. In addition, the control node may base the branching decision partly on the direct input of the first user 110 in a manner resembling an interactive video game, by weighing direct input together with emotion indicators. Direct user input may include, for example, spoken or texted verbal input, input from a game controller, bodily movement detected by a camera array, or selection of control links in a user interface.

At 622, the processor may select the next scene in the narrative branch, again based on emotional impact and an estimation of error. A single narrative branch may contain alternative scenes that do not change the main story line but are tailored for greater emotional impact for the first user 110. For example, the same story may be told using different scenes for child and adult player actors. If the processor detects no emotional error, it may use a default scene or branch.

In accordance with an embodiment, the processor may select the next scene in the narrative branch based on the target emotional arc of the first user 110 and the inferred set of emotion indicators for each of the one or more computer-controlled characters 112a and 112b for the controlled story line of the digital cinematic content 116. Such an embodiment is based on the second factor feedback loop L2 received from the step 'L2'. In accordance with an embodiment, the narrative branch may be selected by the AI engine 206 in conjunction with the ML module 226 of the content management system 102.

In an aspect, the processor selects a scene based on a predictive analysis or an experimental trial. Predicted and experimental scenes may be selected by the processor based on the same or similar factors used to decide between predicted and experimental one or more computer-controlled characters 112a and 112b and dialogues.

At 624, the processor may record the measured emotional response for improving future AI predictions. Consequently, the storyline of the digital cinematic content 116 may be controlled to achieve the target emotional arc of the first user 110.

Figure 7:
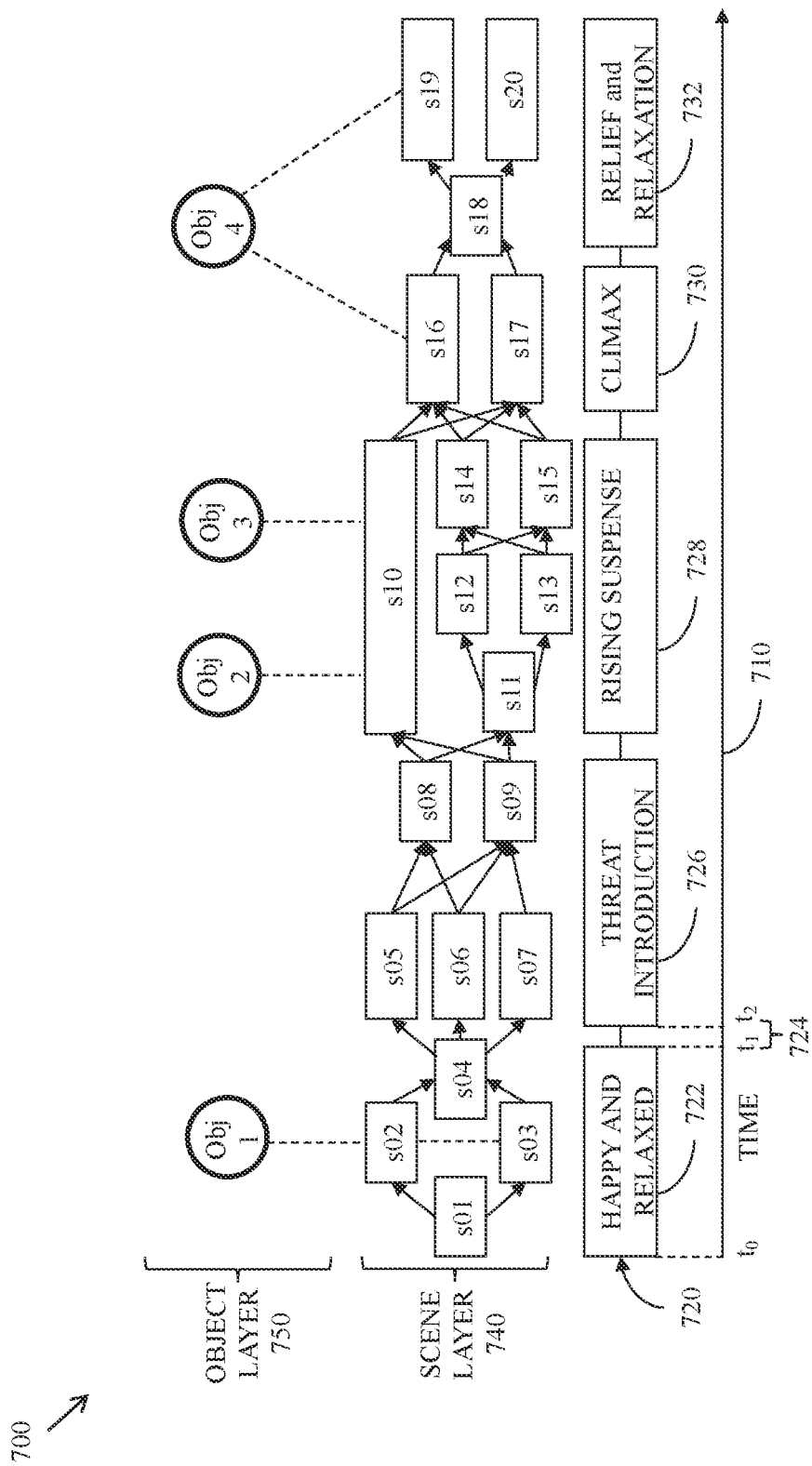
FIG. 7 is a concept diagram illustrating a map of layers and branching of the digital cinematic content with an emotional arc responsive to the emotion indicator of first user and the inferred set of emotion indicators, in accordance with various aspects and example implementations of the present disclosure.

FIG. 7 is a concept diagram illustrating a map of layers and branching of the digital cinematic content 116 with an emotional arc responsive to the emotion indicator of first user 110 and the inferred set of emotion indicators, in accordance with various aspects and example implementations of the present disclosure. FIG. 7 is explained in conjunction with elements from FIG. 1 to FIG. 6. With reference to FIG. 7, there is shown a map 700 of layers and branching of the digital cinematic content 116 with an emotional arc 720 responsive to set of emotion indicators inferred for each of the one or more computer-controlled characters 112a and 112b and the emotion indicators of the first user 110.

The map 700 may be time-correlated against a timeline 710 beginning at initial time t0. The emotional arc 720 may include a sequence of target periods that summarize predominate emotions during a time interval. For example, a predominate emotion in the first segment 722 may be happy and relaxed, in the second interval 726 may be threat introduction (mild fear), in a third interval 728 may be rising suspense, in the fourth interval 730 may be climax (excitement), and in the fifth interval 732 may be relief and relaxation. The intervals may be separated by transition periods, a first transition period 724 between times t1 and t2, in which emotions may overlap.

It should be noted that the emotional arc 720 modelled as a division into segments of predominate emotion is merely an exemplary model and other models may also be implemented without any deviation from the scope of the disclosure. For example, instead of a chain of intervals, as illustrated in the emotional arc 720, a vector of periodically (e.g., every 5 seconds or less) updated variable values may also be modelled as the emotional arc, wherein each value of the vector represents a quantitative value of an emotional quality.

Scene layer 740 may be or may include a directed acyclic graph (DAG) of nodes (e.g., nodes s01 to s20). A story tree is a restricted form of DAG, in which each child node can have only one parent. Scene layers can be arranged in trees, or in any other DAG. FIG. 7 shows a scene layer 740 in a DAG not restricted to a tree. Some downstream scenes may have more than one parent, and the layer may separate into parallel chains in spots. For example, scene s04 has two parents, s02 and s03. Scenes s12-s14 form competing parallel sub-chains. Each scene has a definite length in time. For example, story software may define a maximum length of time for interactive scenes as the maximum time allowed for one or more computer-controlled characters 112a and 112b or scenes to reach an emotional target before giving up. Gaps are shown between scenes merely for illustrative separation. In the digital cinematic content 116, each scene should fit or blend smoothly with the next. Gaps may be avoided by predicting the first user 110 preferences to delete certain scenes or moments, for example, based on prior offline data or an initial calibration exercise. In this manner, knowing that some gaps would otherwise occur if certain scenes or moments were to be abridged, the story controller may call up replacement scene or moments, or implement seamless 'branching' to an appropriate next node or set of nodes to avoid gaps.

Object layer 750 holds emotion-influencing objects appearing in any scene, which may affect the appearance of any scene, or change the audio content of any scene. The emotion-influencing objects may include interactive one or more computer-controlled characters and their dialogues as previously described, props, backgrounds, environments, lighting schemes, surface colours and textures, audio tracks, or any other object in a scene that may be controlled to evoke an emotional response in the first user 110. In the object layer 750, a first computer-controlled character 'Obj 1' may appear or operate in scenes s0l-s02. A second computer-controlled character 'Obj 2' and a third computer-controlled character 'Obj 3' may appear or operate in long scene s10 only. The fourth computer-controlled character 'Obj 4' may appear or operate in both scenes s16 and s19. Few objects are shown in the map 700 for illustrative simplicity. In an actual map of the digital cinematic content 116, most scenes will be associated with numerous different objects. Although the map 700 is simplified, it illustrates an example of a map such as may be used to provide structure and guidance to cinematic AI.

Figure 8A:
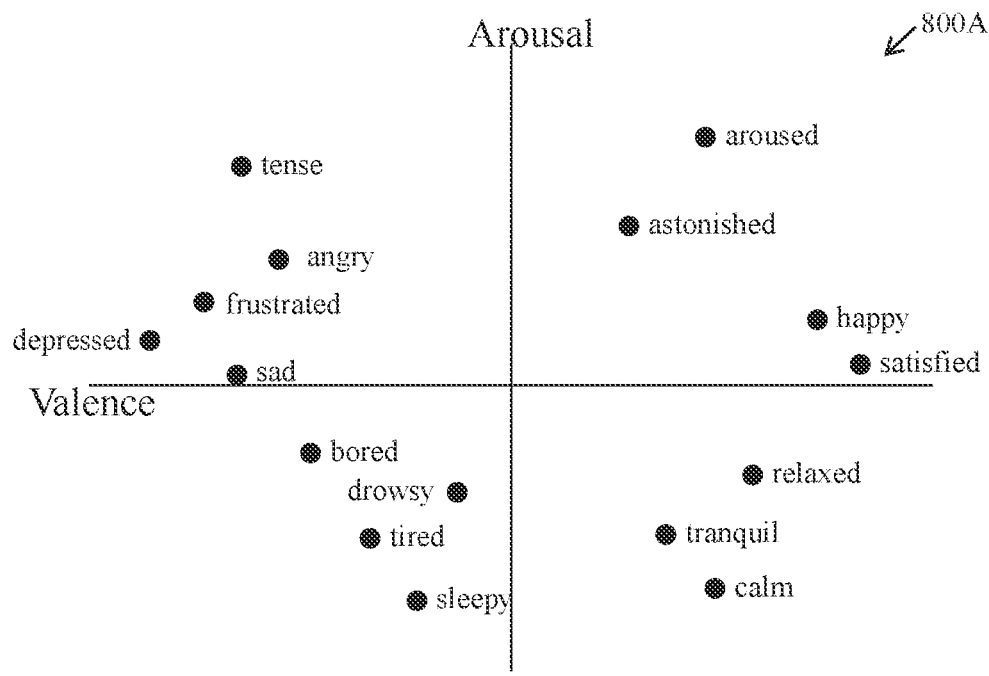
FIG. 8A shows an arrangement of emotional states relative to axes of a two-dimensional emotional space.

FIG. 8A shows an arrangement 800A of emotional states relative to axes of a two-dimensional emotional space. If the first user 110 strays, then the content management system 102 may "test" them by introducing new characters that are meant to elicit an emotional response. The character that is successful then establishes the new path and the emotional arc of that storyline is executed considering the previous path.

Relevant emotions based on a valence/arousal emotional model are shown in the arrangement 800A. The media player module 336 in the client device 104 may measure valence with biometric sensors from the plurality of sensors 306 that measure facial action units, while arousal measurements may be done, for example, via the GSR measurements. Possible valence/arousal sequence targets per story element may be the following:

Sequence 1: Negative valence with above baseline sustained arousal following an interaction from goal-oriented object, situation or computer-controlled character AI (point of attack test objects).

Sequence 2: Negative valence with way above baseline sustained arousal following an interaction from goal-oriented object, situation or computer-controlled character AI (inciting incident test objects).

Sequence 3: Positive valence with above baseline sustained arousal following an interaction from goal-oriented object, situation or computer-controlled character AI (fun & games test objects—rising action).

Sequence 4: Positive valence with way above baseline sustained arousal following an interaction from goal-oriented object, situation or computer-controlled character AI (Midpoint) followed by a strong and abrupt reversal in valence in the opposing direction.

Sequence 5: Negative valence slowly increasing toward positive, decreasing arousal following an interaction from goal-oriented object, situation or computer-controlled character AI (subplot test objects . . . return of character from previous encounter from ACT I).

Sequence 6: Neutral valence slowly decreasing negative, with increasing arousal following an interaction from goal-oriented object, situation or computer-controlled character AI (Epic fight test objects).

Sequence 7: Valence neutralizes, and arousal stabilizes. Twist objects "test" for increased arousal and negative valence one last time (twist fight test objects).

Sequence 8: Positive valence and baseline arousal.

Figure 8B:
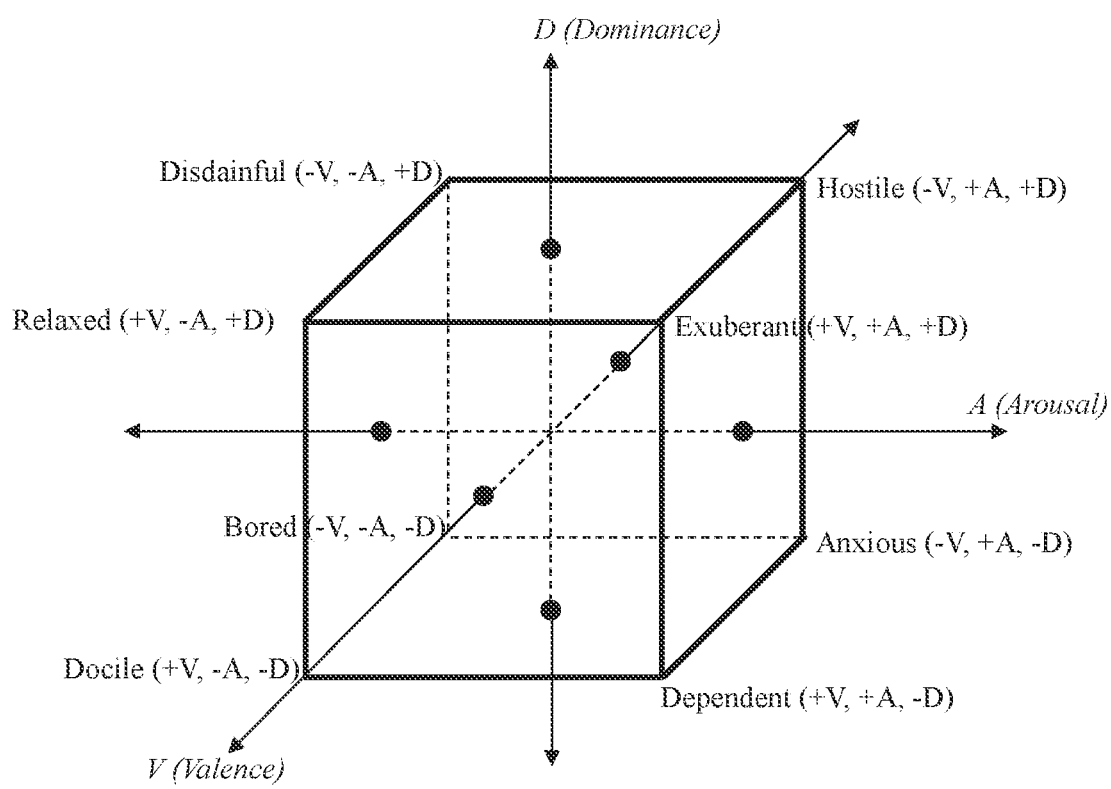
FIG. 8B illustrates a diagram depicting a three-dimensional model of an emotional space, wherein the third axis is social dominance or confidence.

Emotional spaces may be characterized by more than two axes. FIG. 8B illustrates a diagram depicting a three-dimensional model 800B of an emotional space, wherein the third axis is social dominance or confidence. The three-dimensional model 800B illustrates a VAD (valence, arousal, confidence) model. The three-dimensional model 800B may be useful for complex emotions where a social hierarchy is involved.

Baseline arousal and valence may be determined on an individual basis during emotion calibration. The above sequences map out emotions experienced on the valence arousal scale. Actual story however is defined by "test" objects that interact with the first user 110 for eliciting a target emotion. This is one way the story emerges, but the emotional arc does not necessarily have to. If an emotional target is failing, then a processor may change the emotional arc plan for the first user 110 or mood. This may include, for example, reviving a character who from previous experience elicits a strong response.

Figure 9:
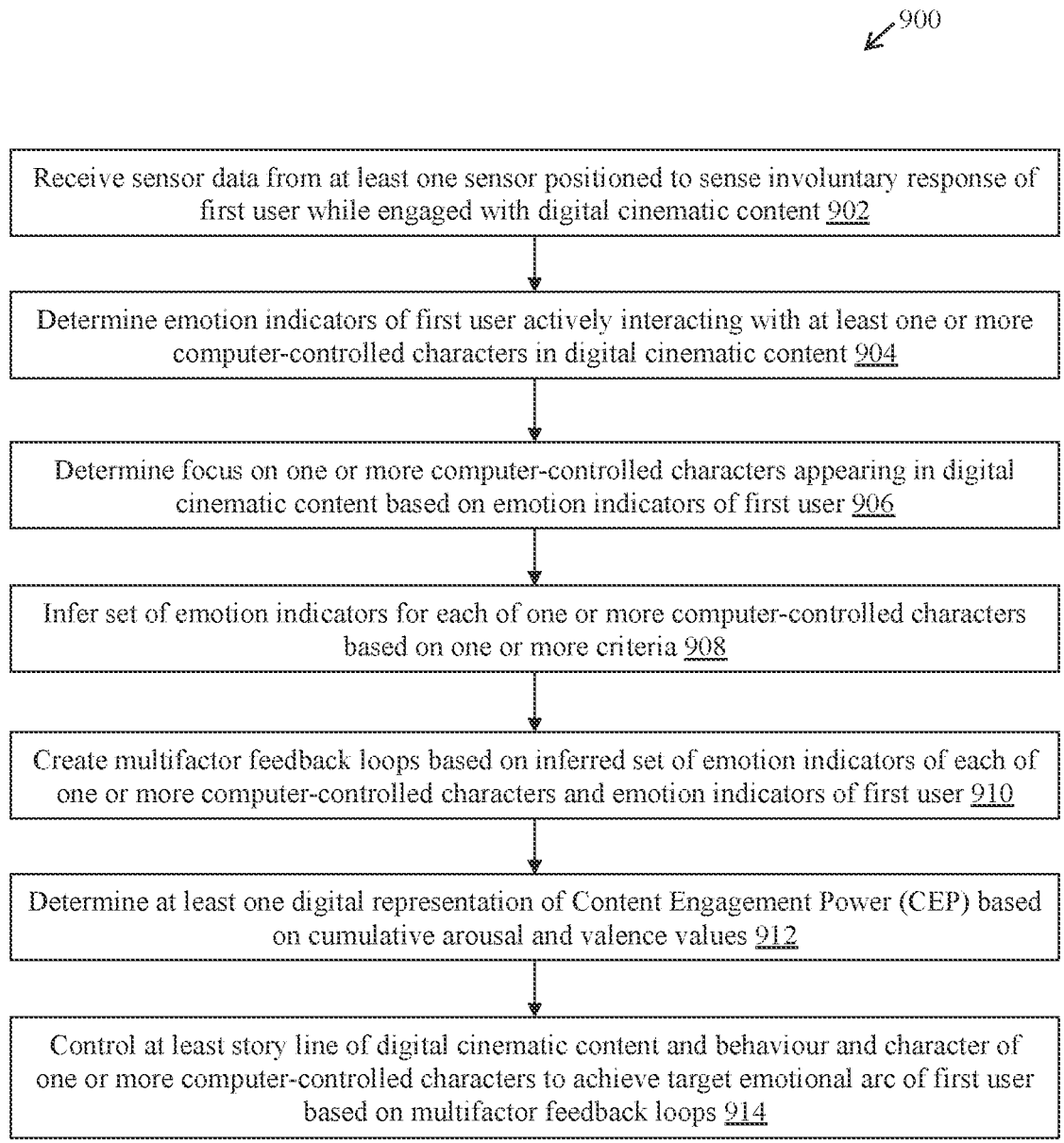
FIG. 9 is a flowchart that illustrates exemplary operations for controlling digital cinematic content based on emotional state of characters, in accordance with various aspects and example implementations of the present disclosure.

FIG. 9 is a flowchart that illustrates exemplary operations for controlling digital cinematic content based on emotional state of characters, in accordance with various aspects and example implementations of the present disclosure. FIG. 9 is explained in conjunction with elements from FIG. 1 to FIG. 8B. With reference to FIG. 9, there is shown a flowchart 900 that illustrates exemplary operations from 902 to 914, as described herein. The exemplary operations illustrated in the flowchart 900 may start at 902 and may be performed by any computing system, apparatus, or device, such as the first processor 204, the AI engine 206, the application data 224, the ML module 226, the correlation module 228, the CEP module 232, and the normalization module 234 of the content management system 102, as described in FIG. 2. Although illustrated with discrete blocks, the exemplary operations associated with one or more blocks of the flowchart 900 may be divided into additional blocks, combined into fewer blocks, or eliminated, depending on the particular implementation.

At 902, sensor data may be received from at least one sensor positioned to sense involuntary response of the first user 110 while engaged with the digital cinematic content 116. In accordance with an embodiment, first processor 204 may be configured to receive the sensor data from at least one sensor from the plurality of sensors 306 in the client device 104 associated with the first user 110. The plurality of sensors 306 may be positioned at or disposed on the client device 104, such as at the VR headset 402a and/or the handheld controller 402b, to sense an involuntary response of the first user 110 while the first user 110 is engaged with the digital cinematic content 116. In various embodiments, the first user 110 may or may not use a controller, such as the handheld controller 402b, to provide direct input, while actively interacting with the one or more computer-controlled characters 112a and 112b or objects in the digital cinematic content 116.

Some sensors from the plurality of sensors 306 are designed to sense physical properties pertaining to the client device 104, such as motion, position, a touch or pressure, a location, proximity, a smoke or vapour, a gyroscopic position, vision or imaging, and the like. Accordingly, various examples of such sensors may include, but are not limited to, a motion sensor (e.g., an accelerometer), a position sensor, a camera or camera array (e.g., stereoscopic array), a biometric temperature or pulse sensor, a touch (pressure) sensor, an altimeter, a location sensor (for example, a Global Positioning System (GPS) receiver and controller), a proximity sensor, a motion sensor, a smoke or vapour detector, a gyroscopic position sensor, a radio receiver, a multi-camera tracking sensor/controller, an eye-tracking sensor, a microphone or a microphone array.

Others, such as biometric sensors, may be designed to sense bio-signals corresponding to psychophysical characteristics or parameters and movement-related metrics, biological data, unique behavioural identifiers, and morphological data pertaining to physical traits of the first user 110. The first user 110 may involuntarily enter a neurological or neurophysiological state (e.g., by exhibiting emotions) in tension, such as valence and arousal. Accordingly, various examples of such biometric sensors may include, but are not limited to, electromyography (EMG) sensors that sense electrical activity produced by skeletal muscles, electroencephalography (EEG) sensors that detect electrical activity in the brain, galvanic skin response (GSR) sensors that detect changes in the electrical resistance of the skin, electrocardiogram (ECG/EKG) sensors that detect heartbeat, optical sensors that detect body language, facial expressions, gaze direction and corneal deformation, brain-computer interface (BCI) signals that directly connect an enhanced brain with a coupled machined (e.g., the media player or an intermediate machine) with or without bidirectional communication capability between the brain and the coupled machine, microphones for audio analysis to detecting emotion indicators, such as voice modulation, a facial electromyography (fEMG) sensor, a video facial action unit (FAU) sensor, a brain machine interface (BMI) sensor, a video pulse detection (VPD) sensor, a pupil dilation sensor, a body chemical sensor, a functional magnetic imaging (fMRI) sensor, a photoplethysmography (PPG) sensor, phased-array radar (PAR) sensor, a functional near-infrared data (fNIR) sensor, sub vocalization data and functional near-infrared data (fNIR) sensor, phased array radar (PAR), body and posture (BAP) data sensor, and phased array microphone (PAM).

In an aspect, prior to providing the sensor data to the first processor 204, the media player module 336 may calibrates itself for use by the first user 110. This may include training of a machine learning algorithm, taking baseline measurements, downloading available calibration data from a server for use in a session with the first user 110, or another customization. The unobtrusive calibration by the media player module 336, alone or in cooperation with one or more artificial intelligence (AI) servers, may occur continuously or at intervals and gradually improve with time as the system builds a more accurate emotional profile of the first user 110. Further, the calibration system may also normalize the sensor data between player actors to establish a baseline for comparing biometric responses between players. An additional content expectation normalization may also be measured to quantify player expectation of content. This process may include the measurement of biometric responses while under representative stimulus content. Calibration and normalization, when used together, provide a robust baseline methodology for computing both singular and aggregate biometric responses between players. The calibration and normalization factors may be used to compute emotional responses and engagement with content.

Post calibration and normalization, the media player module 336 may begin playing the digital cinematic content 116 and the first user 110 may begin viewing it while the plurality of sensors 306 begin detecting biometric signals used for emotional indication.

At 904, emotion indicators of the first user 110 actively interacting with at least the one or more computer-controlled characters 112*a* and 112*b* in the digital cinematic content 116 may be determined. In an embodiment, the first processor 204, in conjunction with the AI engine 206 and the correlation module 228, may be configured to determine the emotion indicators of the first user 110. The emotion indicators of the first user 110 may be determined based on the sensor data received from the plurality of sensors 306 in the client device 104 associated with the first user 110.

In an embodiment, the correlation module 228 may be configured to correlate the sensor data associated with the first user 110 to an emotion indicator by using a machine learning algorithm. Optionally, the machine learning algorithm may be configured to process contextual data in addition to the received sensor data, based on which the accuracy may be further improved. Examples of the contextual data may include, but not limited to, a location of the first user 110, a position of the first user 110, time-of-day, day-of-week, ambient light level, ambient noise level, and so forth. For example, if the context data pertaining to the first user 110 indicates high distraction, biometric data may have a different significance than in a quiet environment.

More specifically, the correlation module 228 may use a machine learning training process to detect the correlations between audio-video and narrative stimuli and the biometric data. The training process may receive audio-video and narrative stimuli data that is time-correlated to the biometric data from the media player module 336. The audio-video and narrative stimuli data may be associated with the first user 110, cohort, or may be generic.

On the other hand, generic input data may be used to calibrate a baseline for emotional response and to classify a baseline emotional response to a scene or arrangement of cinematographic elements. If most users exhibit similar biometric tells when viewing a scene within a narrative context, the scene may be classified with other scenes that provoke similar biometric data from users. The similar scenes may be collected and reviewed by a human creative producer, who may score the scenes on emotion indicator metrics manually, assisted by automated analysis tools. In an alternative, the emotion indicator may be scored by human and semi-automatic processing without being classed with similar scenes. These human-scored elements, such as via online survey forms, become training data for the machine learning process.

The ML training process compares human and machine-determined scores of scenes or other cinematographic elements and uses iterative machine learning methods as known in the art to reduce error between the training data and its own estimates. Creative content analysts may score data from multiple users based on their professional judgment and experience. Individual users may score their own content. Other training approaches include clinical testing of subject biometric responses over short content segments, followed by surveying the clinical subjects regarding their emotional states. Accordingly, training data may be developed for the machine learning process. Once the machine learning process has learned correlations for a user or a group of users, it is ready to apply its learned correlations during real-time content consumption.

At 906, a focus on the one or more computer-controlled characters 112*a* and 112*b* appearing in the digital cinematic content 116 may be determined based on the emotion indicators of the first user 110. In an embodiment, the first processor 204, in conjunction with the AI engine 206, may be configured to determine the focus on the one or more computer-controlled characters 112*a* and 112*b* based on the emotion indicators of the first user 110. In accordance with another embodiment, the focus on the one or more computer-controlled characters 112*a* and 112*b* may be further determined based on the scene identifier of the current scene of the digital cinematic content 116 displayed at the client device 104. From the scene data, the first processor 204, in conjunction with the AI engine 206, may narrow the list of available computer-controlled characters to those available for the scene at hand, for example using a database query to retrieve all computer-controlled character identifiers that the content designers have associated with the scene.

At 908, a set of emotion indicators may be inferred for each of the one or more computer-controlled characters 112*a* and 112*b* based on one or more criteria. In an embodiment, the first processor 204, in conjunction with the AI engine 206, may be configured to infer the set of emotion indicators for each of the one or more computer-controlled characters 112*a* and 112*b* who may be present in the digital cinematic content 116. The set of emotion indicators may be inferred for each of the one or more computer-controlled characters 112*a* and 112*b* based on one or more criteria.

The set of emotion indicators for each of the one or more computer-controlled characters 112*a* and 112*b* may be determined based on an application of various algorithms, such as machine learning, computer vision, deep learning, sentiment detection, and object detection algorithms, on the one or more computer-controlled characters 112*a* and 112*b* and objects appearing in the digital cinematic content 116. It may be noted that the set of emotion indicators for each of the one or more computer-controlled characters 112a and 112b is inferred whereas the emotion indicators of the first user 110 are directly determined from the sensor data. The set of emotion indicators may be inferred because no biometric data can be exhibited by the one or more computer-controlled characters 112a and 112b. Accordingly, the valence or arousal values can be measured based on the inferred set of emotion indicators for the one or more computer-controlled characters 112a and 112b.

In an embodiment, the first processor 204, in conjunction with the AI engine 206, may be configured to determine a semantics of the set of emotion indicators based on a social appraisal by a focus group for at least the set of emotion indicators. The focus group is culturally and demographically like a target audience who may determine the semantics associated with the set of emotion indicators. The focus group may be provided with various databases, such as International Affective Digitized Sounds (IADS-E), Geneva Affective PicturE Database (GAPED), International Affective Picture System (IAPS), and the like, that may comprise one or more of reference images, video clips, dialogues, and 360-degree panoramas. Accordingly, the focus group provides normative ratings of emotion (pleasure, valence, arousal, dominance) for a set of images, clips, and dialogues that provide a set of normative emotional stimuli for experimental investigations of emotion and attention. It may be observed how the focus group appraises, feels, and emotes for such images, clips, and dialogues, based on which semantics of emotional indicators of actual images, clips, and dialogues of the one or more computer-controlled characters 112a and 112b and objects may be determined.

In another embodiment, the first processor 204, in conjunction with the AI engine 206, may be configured to detect at least one of an action, an inaction, or a body language of the one or more computer-controlled characters 112a and 112b based on one or more computer vision techniques. An action may describe as an interaction of the one or more computer-controlled characters 112a and 112b with other entities, such as other computer-controlled characters, the avatar 110a of the first user 110, and one or more objects appearing in the digital cinematic content 116. Conceptually, an action may consist of multiple phases, i.e., approaching the other entities, interacting, and withdrawing from the interaction with the other entities. If no action is performed, it may be termed as inaction. Body language may correspond to physical behaviors or non-verbal signals, as opposed to words, for expressing or conveying information by the one or more computer-controlled characters 112a and 112b.

Non-limiting examples of the body language may include facial expressions (corresponding to happiness, sadness, focused, unfocused, confident and afraid), head and neck signals (corresponding to nodding, shaking, tilting, lowering or raising the head), body proxemics (corresponding to reactions to others' invasions of personal territories), gestures (made with hands, arms, fingers, head, or legs), haptics (corresponding to handshakes, holding hands, back slapping, high fives, brushing up against someone or patting), and oculesics (corresponding to eye movement, eye behavior, gaze, and eye-related nonverbal communication). Such actions, inactions, and the body language of the one or more computer-controlled characters 112a and 112b may be detected by the first processor 204 and the AI engine 206 based on various techniques. For example, the actions, inactions, and body language may be detected based on numerous computer vision techniques, such as object detection, event detection, character tracking, object recognition, 3D pose estimation, learning, indexing, motion estimation, 3D scene modelling. Examples of other algorithms, models, and machines may include skeletal-based algorithms, appearance-based models, gesture recognition algorithm using support vector machines (SVM) and histogram of oriented gradient (HOG), convolutional neural network (CNN) model, rule-based systems, and the like. Thus, the inference of the set of emotion indicators for each of the one or more computer-controlled characters 112a and 112b may be based on the sentiments of the one or more computer-controlled characters 112a and 112b.

In another embodiment, the first processor 204, in conjunction with the AI engine 206, may be configured to determine sentiments of the one or more computer-controlled characters 112a and 112b. The sentiments of the one or more computer-controlled characters 112a and 112b may be determined as the one or more computer-controlled characters 112a and 112b interacts with the other entities appearing in the digital cinematic content 116. The sentiments of the one or more computer-controlled characters 112a and 112b may correspond to subjective opinions or feelings for a particular subject. Such subjective opinions or feelings may be identified, extracted, quantified, and analysed to determine affective states and subjective information pertaining to the one or more computer-controlled characters 112a and 112b. In an embodiment, the sentiments of the one or more computer-controlled characters 112a and 112b may be determined based on the behavioural characteristics and dialogues spoken by the one or more computer-controlled characters 112a and 112b.

In accordance with an embodiment, the sentiments of the one or more computer-controlled characters 112a and 112b may be determined based on the emotional tone in spoken dialogues during current utterance. In such case, the sentiment corresponding to current utterance may be determined using techniques related to natural language processing (NLP), such as bag-of-words (BoW) and term frequency-inverse document frequency (TF-IDF), and machine learning. In accordance with another embodiment, the sentiments of the one or more computer-controlled characters 112a and 112b may be predicted for the upcoming utterance. In such case, the sentiment for the upcoming utterance may be determined using a recurrent neural network on context sequences of words, defined as two utterances of each computer-controlled character. It should be noted that the above embodiment of determining the sentiment based on the utterances is merely for exemplary purposes. The sentiment may be further determined based on other parameters, such as body language, gestures, facial expressions, and the like, without any deviation from the scope of the disclosure. It should also be noted that the sentiments of one computer-controlled character about a particular subject may be different from other computer-controlled character about the same subject. Thus, the inference of the set of emotion indicators for each of the one or more computer-controlled characters 112a and 112b may be based on the third criterion from the one or more criteria that correspond to the sentiments of the one or more computer-controlled characters 112a and 112b.

In another embodiment, the first processor 204, in conjunction with the AI engine 206, may be further configured to determine an emotive or emotional conjugation. The emotive or emotional conjugation indicates a form of a grammatical conjugation for describing, by a computer-controlled character, own behavior more charitably than others. Said differently, the emotive or emotional conjugation occurs when a computer-controlled character compares its own performance at a task with other computer-controlled characters. The task may be, for example, a cognitive or behavioural task, performed or to be performed by the computer-controlled character in the digital cinematic content 116.

Emotive or emotional conjugation may be used by the one or more computer-controlled characters 112a and 112b to refer to a subject and express its agreement, contempt, or boredom. Such emotive or emotional conjugation may not be based on objective facts or rooted in conclusions reached through rational discourse. Instead, the computer-controlled character forms own subjective interpretations when reacting to facts and figures as the computer-controlled character make decisions unconsciously that appeal to their emotions, rather than their intellect. For example, a computer-controlled character may classify itself as an entrepreneur whereas others may refer him as a grifter. The emotive or emotional conjugation may also be referred to as 'Russell Conjugation' that are 'Bias Linguistic Constructions.' 'Russell Conjugation' may mean that there is an emotional bias to the words that are used which may be used to infer emotions and then treat the one or more computer-controlled characters 112a and 112b as actually having a nervous system response.

Emotive or emotional conjugation in the words, sentences, or dialogues uttered by the one or more computer-controlled characters 112a and 112b may be detected and highlighted based on conjugation detection tools. Such tools may parse the utterances to identify adjectives, adverbs, and nouns and determine which ones have emotive connotations. Thus, the inference of the set of emotion indicators for each of the one or more computer-controlled characters 112a and 112b may be based on the fourth criterion of the one or more criteria that corresponds to the emotive or emotional conjugation of the one or more computer-controlled characters 112a and 112b.

In another embodiment, the first processor 204, in conjunction with the AI engine 206, may be configured to determine arousal and valence values for the one or more computer-controlled characters 112a and 112b. The arousal and valence values may be determined based on a plurality of words that may be spoken by the one or more computer-controlled characters 112a and 112b (referred to as denotation) and connotation of such plurality of words. Connotation represents various social overtones, cultural implications, or emotional meanings associated with a word. For example, a computer-controlled character may say a dialogue, "I am feeling blue." Denotation of the word 'blue' is the colour blue, which has a valence score as 0.646, an arousal score as 0.137, and a dominance score as 0.291. However, NLP tools may determine the connotation of the word 'blue' as 'sad,' that has a valence score as 0.225, an arousal score as 0.333, and a dominance score as 0.149. Thus, in the context of the dialogue and the scene, the valence, arousal, and dominance scores of the connotation may be considered. Accordingly, the first processor 204, in conjunction with the AI engine 206, may be configured to infer the set of emotion indicators for each of the one or more computer-controlled characters 112a and 112b based on the fifth criterion from the one or more criteria that corresponds to the arousal and the valence values based on the plurality of words spoken by the one or more computer-controlled characters 112a and 112b.

At 910, multifactor feedback loops may be created based on the inferred set of emotion indicators of each of one or more computer-controlled characters 112a and 112b and emotion indicators of first user 110. In accordance with an embodiment, the first processor 204, in conjunction with the AI engine 206, may be configured to create multifactor feedback loops based on the inferred set of emotion indicators of each of one or more computer-controlled characters 112a and 112b and emotion indicators of first user 110. For example, as described in FIG. 6, the first processor 204, in conjunction with the AI engine 206, may create the first factor feedback loop 'L1', the second factor feedback loop 'L2' and the third factor feedback loop 'L3' that may facilitate in achieving the target emotional arc of the first user 110.

At 912, at least one digital representation of CEP may be determined based on cumulative arousal and valence values. In accordance with an embodiment, the first processor 204, in conjunction with the CEP module 232 and the AI engine 206, may be configured to determine at least one digital representation of CEP based on the cumulative arousal and valence values. For example, as described in FIG. 6, the third factor feedback loop 'L3' may facilitate in determining the engagement measure of the digital cinematic content 116 based on the inferred set of emotion indicators of the selected characters from the plurality of computer-controlled characters and corresponding behaviour or interaction with other characters in the virtual environment.

In accordance with an embodiment, the first processor 204, in conjunction with the CEP module 232 and the AI engine 206, may be configured to determine at least one digital representation of the CEP based on the cumulative arousal and valence values. The cumulative arousal and valence values may be based on the set of emotion indicators inferred for each of the one or more computer-controlled characters 112a and 112b and emotion indicators of the first user 110. In other words, the content management system 102 may be configured to calculate the CEP value based on a ratio of a sum of the event powers to the expectation power for a comparable event in corresponding genre of the digital cinematic content 116. Details for the determination of the CEP based on cumulative arousal and valence values is described in detail in FIG. 10.

At 914, at least story line of the digital cinematic content and behaviour and character of one or more computer-controlled characters may be controlled to achieve target emotional arc of first user 110 based on multifactor feedback loops. In accordance with an embodiment, the first processor 204, in conjunction with the AI engine 206, may be configured to control at least a story line of the digital cinematic content 116 and behavioural characteristics of the one or more computer-controlled characters 112a and 112b to achieve a target emotional arc of the first user 110 based on the multifactor feedback loops.

For example, as described in FIG. 6, the first factor feedback loop 'L1' may control the behaviour of the one or more computer-controlled characters 112a and 112b and selection of characters from the plurality of computer-controlled characters to achieve the target emotional arc of the first user 110.

As a result of the first factor feedback loop 'L1', the first processor 204, in conjunction with the AI engine 206, may be configured to adjust the focus, emotional goals, and tactics of the one or more computer-controlled characters 112a and 112b for the controlled behavioural characteristics of the one or more computer-controlled characters 112a and 112b. Further, the first processor 204, in conjunction with the AI engine 206, may be configured to adjust next dialogues for the one or more computer-controlled characters 112a and 112b based on the adjusted focus, the adjusted emotional goals, and the adjusted tactics of the one or more computer-controlled characters 112a and 112b.

Further, the second factor feedback loop 'L2' may control or influence the next scene selection of the digital cinematic content 116. Accordingly, the target emotional arc of the first user 110 may be achieved. Further, the third factor feedback loop 'L3' may facilitate in determining the CEP value for the digital cinematic content 116, as described in detail in FIG. 10.

Figure 10:
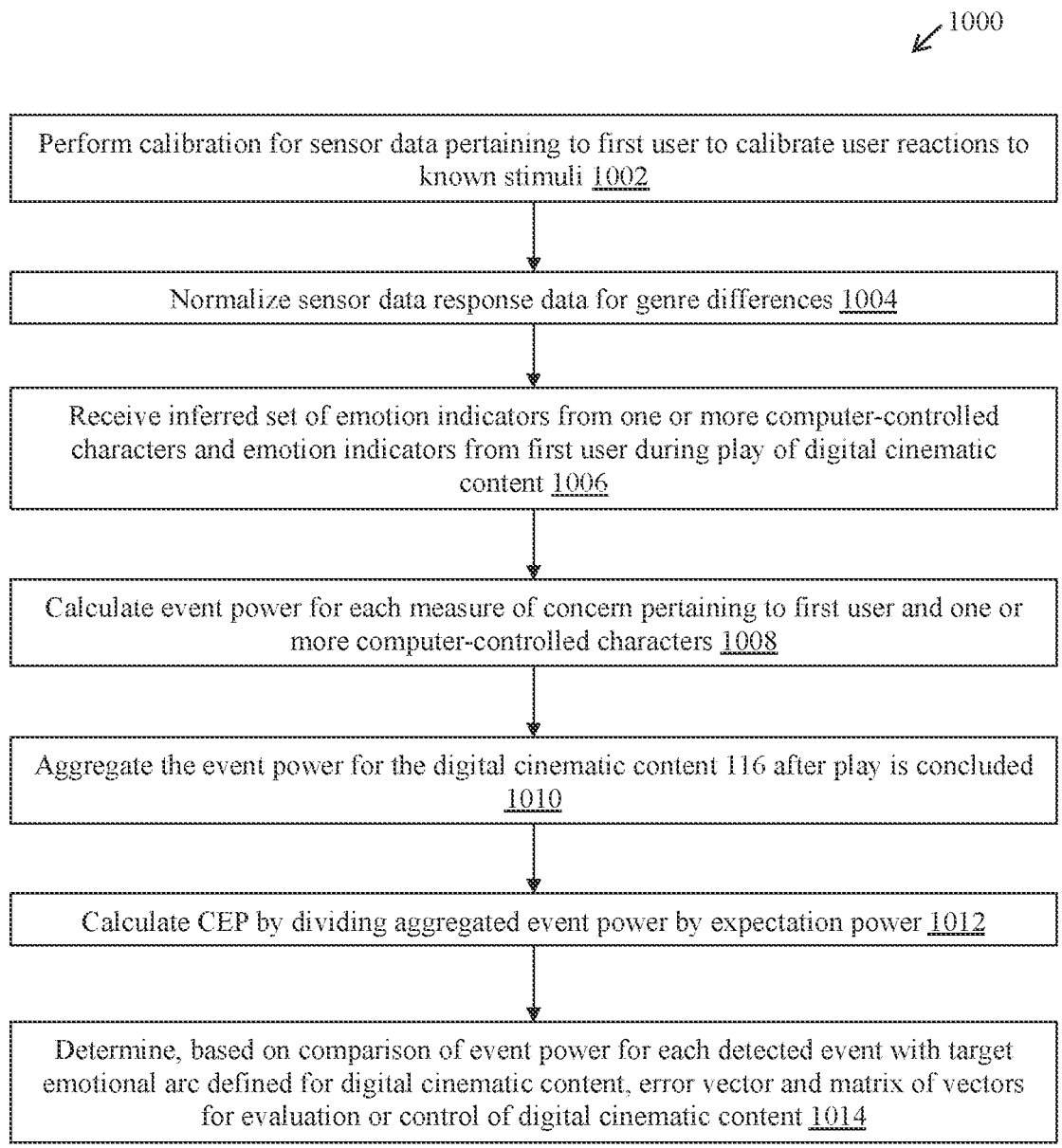
FIG. 10 depicts a flowchart that illustrates exemplary operations for determining the CEP, in accordance with various aspects and example implementations of the present disclosure.

FIG. 10 depicts a flowchart that illustrates exemplary operations for determining the CEP value, in accordance with various aspects and example implementations of the present disclosure. FIG. 10 is explained in conjunction with elements from FIG. 1 to FIG. 9. With reference to FIG. 10, there is shown a flowchart 1000, that illustrates exemplary operations from 1002 to 1014, as described herein. The exemplary operations illustrated in the flowchart 1000 may start at 1002 and may be performed by any computing system, apparatus, or device of the content management system 102, as described in FIG. 2. Although illustrated with discrete blocks, the exemplary operations associated with one or more blocks of the flowchart 1000 and may be divided into additional blocks, combined into fewer blocks, or eliminated, depending on the particular implementation.

As described hereinafter, cumulative arousal and valence correspond to arousal and valence values for the one or more computer-controlled characters 112a and 112b and the first user 110. The arousal and valence values for the one or more computer-controlled characters 112a and 112b may be determined based on the corresponding inferred set of emotion indicators. Similarly, arousal and valence values for the first user 110 may be determined based on the corresponding emotion indicators.

The CEP is a ratio of a sum of event power '$P_v$' for the subject content to expectation power '$P_x$' for comparable content in a genre of the digital cinematic content 116. $P_v$ and $P_x$ are calculated using the same methodology for different subject matter and in the general case for different users. As such, the sums cover different total times, event power $P_v$ covering a time period '$t_v$' that equals a sum of '$n$' number of event power periods $\Delta t_v$ for the subject content:

$$t_v = \Sigma_n^1 \Delta t_v \qquad \text{Eq. 1}$$

Likewise, expectation power $P_x$ covers a period '$t_x$' that equals a sum of '$m$' number of event power periods $\Delta t_x$ for the expectation content:

$$t_x = \Sigma_m^1 \Delta t_x \qquad \text{Eq. 2}$$

Each of powers $P_v$ and $P_x$ is, for any given event '$n$' or '$m$', a dot product of a power vector $P$ and a weighting vector $W$ of dimension i, as follows:

$$P_{v_n} = \vec{P_v} \cdot \vec{W} = \Sigma_i^1 P_{vi} W_i = P_{v1} W_1 + P_{v2} W_2 + \ldots + P_{vi} W_i \qquad \text{Eq. 3}$$

$$P_{x_m} = \vec{P_x} \cdot \vec{W} = \Sigma_i^1 P_{xi} W_i = P_{x1} W_1 + P_{x2} W_2 + \ldots + P_{xi} W_i \qquad \text{Eq. 4}$$

In general, the power vector $\vec{P}$ may be defined variously. In any given computation of CEP, the power vectors for the subject content and the expectation baseline should be defined consistently with one another, and the weighting vectors should be identical. A power vector may include arousal measures only, valence values only, a combination of arousal measures and valence measures, or a combination of any of the foregoing with other measures, for example a confidence measure. In one embodiment, CEP is calculated using power vector $\vec{P}$ defined by a combination of '$j$' arousal measures '$a_j$' and '$k$' valence measures '$v_k$', each of which is adjusted by a calibration offset 'C' from a known stimulus, wherein j and k are any non-negative integer, as follows:

$$\vec{P_c} = (a_1 C_1, \ldots, a_j C_j, \ldots, v_k C_{j+k}) \qquad \text{Eq. 5}$$

wherein $$C_j = S_j - S_j O_j = S_j (1 - O_j) \qquad \text{Eq. 6}$$

The index j in Equation 6 signifies an index from 1 to j+k, $S_j$ signifies a scaling factor and $O_j$ signifies the offset between the minimum of the sensor data range and its true minimum. A weighting vector W corresponding to the power vector of Equation 5 may be expressed as:

$$\vec{W} = (w_1, \ldots, w_j w_{j+1}, \ldots, w_k) \qquad \text{Eq. 7}$$

wherein each weight value scales its corresponding factor in proportion to the factor's relative estimated reliability.

With calibrated dot products $P_{v_n}$, $P_{x_m}$ given by Equations 3 and 4 and time factors as given by Equations 1 and 2, a processor may compute the CEP for a single user, i.e., the first user 110, as follows:

$$CEP_{user}(\text{dBm}) = 10 \cdot \log_{10} \left( \frac{\sum_n^1 P_v \Delta t_v}{\sum_m^1 P_x \Delta t_x} \cdot \frac{t_x}{t_v} \right) \qquad \text{Eq. 8}$$

The ratio $t_x/t_v$ normalizes inequality in the disparate time series sums and renders the ratio unitless. CEP value greater than 1 indicates that the first viewer 110 has had an emotionally engaging experience above his expectations relative to the genre of the digital cinematic content 116. CEP value less than 1 indicates that engagement is less than the expectations of the first user 110 for the content genre of the digital cinematic content 116.

The CEP can also be calculated for content titles across audiences of '$v$' users as a ratio of the content event power for the '$x$' users to the expectation power for '$m$' not necessarily identical users, as follows:

$$CEP_{title}(\text{dBm}) = 10 \cdot \log_{10} \left( \frac{\sum_n^1 P_v \Delta t_v}{\sum_m^1 P_x \Delta t_x} \cdot \frac{t_x}{t_v} \right) \qquad \text{Eq. 9}$$

The variables v and x are the number of content users and engagement baseline viewers, respectively. The audience expectation power in the denominator represents the expectation that the audience brings to the content, while event power in the numerator represents the sum of the audience's arousal or valence events while experiencing the digital cinematic content 116. The processor sums the event power over each event (n) and user (v), and the expectation power over each event (m) and user (x). It then calculates the CEP by calculating the ratio of event power to expectation power and normalizing disparate time sums and audience counts by the ratio $xt_x/vt_v$. The CEP is a component of content rating. Other components of content rating may include aggregate valence error and valence error for particular valence targets (e.g., triumph, despair, and the like). Equation 5 describes a calibrated power vector made up of the cumulative arousal and valence measures. In an alternative, a partially uncalibrated power vector may be defined in which the all the emotion indicators are scaled as part of lower-level digital signal processing before conversion to a digital value but not offset for the first user 110 as follows:

$$\vec{P} = (a_1, \ldots, a_j v, \ldots, v_k) \qquad \text{Eq. 10}$$

If using a partially uncalibrated power vector, an aggregate calibration offset may be computed for each factor and subtracted from the dot products $P_{v_n}$, $P_{x_m}$ given by Equations 3 and 4 before calculating the CEP. For example, an aggregate calibration offset for $P_{v_n}$ may be given by:

$$C_v = i(\vec{C_v} \cdot \vec{W}) = i\Sigma_i^1 C_{v_i} W_i = C_{v_1} W_1 + C_{v_2} W_2 + \ldots + C_{v_i} W_i \quad \text{Eq. 11}$$

In such case, a calibrated value of the power vector $P_{v_n}$, may be computed by:

$$P_{v_n} - C_{v_n} \quad \text{Eq. 12}$$

The calibrated power vector may be similarly computed.

Referring again to the flowchart 1000 in which the foregoing expressions can be used, at 1002, the calibration module 230 may be configured to perform calibration for the sensor data pertaining to the first user 110 to calibrate user reactions to known stimuli, for example a known resting stimulus, a known arousing stimulus, a known positive valence stimulus, and a known negative valence stimulus. The known stimuli may be tested using a focus group that is culturally and demographically like the target audience and maintained in a database for use in calibration. For example, the International Affective Picture System (IAPS) is a database of pictures for studying emotion and attention in psychological research. For consistency with the content platform, images or those found in the IAPS or similar knowledge bases may be produced in a format consistent with the targeted platform for use in calibration. For example, pictures of an emotionally triggering subject can be produced as video clips. Calibration ensures that sensors are operating as expected and providing data consistently between users. Inconsistent results may indicate malfunctioning or misconfigured sensors that can be corrected or disregarded. The calibration module 230 may determine one or more calibration coefficients for adjusting signal values for consistency across devices and/or users.

Calibration may have both scaling and offset characteristics. To be useful as an indicator of arousal, valence, or other psychological state, sensor data may need calibrating with both scaling and offset factors. For example, GSR may in theory vary between zero and 1, but in practice depend on fixed and variable conditions of human skin that vary across individuals and with time. In any given session, GSR of the first user 110 may range between some $GSR_{min} > 0$ and some $GSR_{max} < 1$. Both the magnitude of the range and its scale may be measured by exposing the subject to known stimuli and estimating the magnitude and scale of the calibration factor by comparing the results from the session with known stimuli to the expected range for a sensor of the same type. In many cases, the reliability of calibration may be doubtful, or calibration data may be unavailable, making it necessary to estimate calibration factors from live data. In some embodiments, sensor data might be pre-calibrated using an adaptive machine learning algorithm that adjusts calibration factors for each data stream as more data is received and spares higher-level processing from the task of adjusting for calibration.

At 1004, the normalization module 234 may be configured to normalize the sensor data for genre differences, for example using Equation 8 or 9. Different genres produce different valence and arousal scores. For example, action-adventure genres have a different pace, emotional target, and intensity. Thus, engagement power cannot be compared across genres unless the engagement profile of the genre is considered. Genre normalization scores the content relative to content in the same genre, enabling comparison on an equivalent basis across genres. The normalization may be performed on a test audience or focus group, or on the subject group prior to the main feature, using an expected normalization stimulus. For example, the audience may view one or more trailers in the same genre as the main feature, and event power may be calculated for the one or more trailers. In an alternative, archived data for the same users or same user cohort may be used to calculate expectation power. Expectation power may be calculated using the same algorithms as used or will be used for measurements of event power and can be adjusted using the same calibration coefficients.

At 1006, the first processor 204 may receive the inferred set of emotion indicators from one or more computer-controlled characters 112a and 112b and the emotion indicators from the first user 110 during play of the digital cinematic content 116.

At 1008, the first processor 204 may calculate event powers for each measure of concern, such as arousal and one or more valence qualities, pertaining to the first user 110 and the one or more computer-controlled characters 112a and 112b.

At 1010, the first processor 204 may sum up or otherwise aggregate the event power for the digital cinematic content 116 after play is concluded, or on a running basis during the play.

At 1012, the CEP module 232 may calculate the CEP by dividing the aggregated event power by the expectation power. The CEP module 232 may apply applicable calibration coefficients and then calculates the CEP.

In accordance with an embodiment, the CEP module 232 may include comparing an event power for each detected event, or for a lesser subset of detected events, with a target emotional arc defined for the digital cinematic content 116. The target emotional arc may be, for example, defined by a creative producer, a predicted arc, a past arc or arcs for the digital cinematic content 116, or a combination of the foregoing. The target emotional arc may comprise a set of targeted digital representations of the cumulative valence values, each uniquely associated with a different interval of a continuous time sequence.

At 1014, the error module 236 may determine, based on the comparison, error vector and matrix of vectors for evaluation or control of the digital cinematic content 116. In other words, the error module 236 may save, increment or otherwise accumulate an error vector value describing the error for one or more variables. The error vector may include a difference between the references arc and a measured response for each measured value (e.g., arousal and valence values) for a specified scene, time period, or set of video frames.

Such error measurement may include or augment other metrics for evaluation of the digital cinematic content 116. The CEP and error measurements may be compared to purchases, subscriptions, or other conversions related to the digital cinematic content 116. The content management system 102 may also measure consistency in audience response, using standard deviation or other statistical measures. The content management system 102 may measure the CEP, valence and arousal for individual, cohorts, and aggregate audiences.

Figure 11:
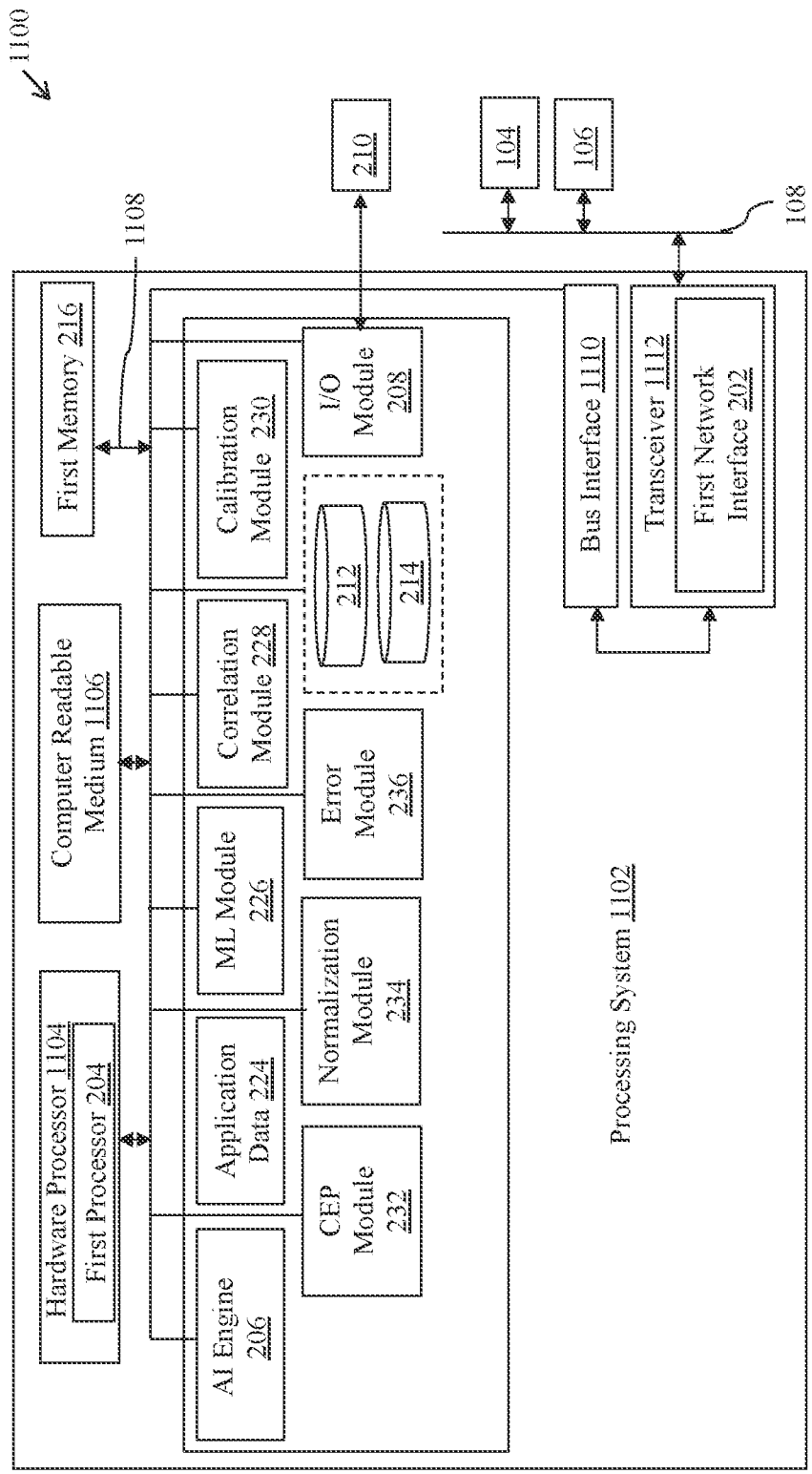
FIG. 11 is a conceptual block diagram illustrating components of an apparatus or system for controlling digital cinematic content based on emotional level of characters, in accordance with various aspects and example implementations of the present disclosure.

FIG. 11 is a conceptual diagram illustrating an example of a hardware implementation for an exemplary content management system, such as the content management system 102 of FIG. 1 and FIG. 2 employing a processing system for controlling digital cinematic content based on emotional state of characters, in accordance with various aspects and example implementations of the present disclosure. FIG. 11 is explained in conjunction with elements from previous figures. Referring to FIG. 11, the hardware implementation shown by the conceptual diagram 1100 for the content management system 102 employs a processing system 1102 for controlling digital cinematic content based on emotional state of characters, in accordance with an exemplary embodiment of the disclosure, as described herein.

In some examples, the processing system 1102 may comprise one or more hardware processors, such as a hardware processor 1104, a non-transitory computer-readable medium 1106, a bus 1108, a bus interface 1110, and a transceiver 1112. FIG. 11 further illustrates the first processor 204, the AI engine 206, the I/O module 208, the data source 210, the character profile database 212, the content metadata 214, the application data 224, the ML module 226, the correlation module 228, the calibration module 230, the CEP module 232, the normalization module 234, and the error module 236, as described in FIG. 2.

The hardware processor 1104 may be configured to execute or implement software, hardware, and/or firmware modules to manage the bus 1108 and general processing, including the execution of a set of instructions stored on the non-transitory computer-readable medium 1106. The set of instructions, when executed by the hardware processor 1104, causes the content management system 102 to execute the various functions described herein for any particular apparatus. The hardware processor 1104 may be implemented, based on a number of processor technologies known in the art. Examples of the hardware processor realized as the hardware processor 1104 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 1106 may be used for storing data that is manipulated by the hardware processor 1104 when executing the set of instructions. The data is stored for short periods or in the presence of power. The non-transitory first computer readable medium 606 may also be configured to store data for the first processor 204, the AI engine 206, the I/O module 208, the data source 210, the character profile database 212, the content metadata 214, the application data 224, the ML module 226, the correlation module 228, the calibration module 230, the CEP module 232, the normalization module 234, and the error module 236, as described in detail in FIG. 2.

As described above, the first memory 216 may store local versions of applications being executed by the hardware processor 1104, related instructions and corresponding parameters. The first memory 216 may include a type of memory usable by a computer, such as RAM, ROM, tapes, magnetic discs, optical discs, volatile memory, non-volatile memory, and any combination thereof. Additionally, the hardware processor 1104 and the first memory 216 may include and execute an operating system executing on the hardware processor 1104, one or more applications and display drivers and/or other components.

The bus 1108 is configured to link together various circuits. In this example, the content management system 102 employing the processing system 1102 and the non-transitory computer-readable medium 1106 may be implemented with bus architecture, represented generally by the bus 1108. The bus 1108 may include any number of interconnecting buses and bridges depending on the specific implementation of the content management system 112 and the overall design constraints. A bus interface 1110 may be configured to provide an interface between the bus 1108 and other circuits, such as, the transceiver 1112.

The transceiver 1112 may be configured to provide a communication of the content management system 102 with various other external systems, such as the client device 104, and the server 106, via the communication network 108. The transceiver 1112 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX. In accordance with an embodiment, the transceiver 1112 may provide for establishing and maintaining communications, such as UWB communications, with one or more other devices, parties, entities, and the like, utilizing hardware, software, and services. For example, the transceiver 1112 may provide for establishing and maintaining the short- or long-range communication protocols.

It should be recognized that, in some embodiments of the disclosure, one or more components of FIG. 11 may include software whose corresponding code may be executed by at least one processor, for across multiple processing environments. For example, the first processor 204, the AI engine 206, the I/O module 208, the data source 210, the character profile database 212, the content metadata 214, the application data 224, the ML module 226, the correlation module 228, the calibration module 230, the CEP module 232, the normalization module 234, and the error module 236 may include software that may be executed across a single or multiple processing environments.

In an aspect of the disclosure, the hardware processor 1104, the non-transitory computer-readable medium 1106, or a combination of both may be configured or otherwise specially programmed to execute the operations or functionality of the first processor 204, the AI engine 206, the I/O module 208, the data source 210, the character profile database 212, the content metadata 214, the application data 224, the ML module 226, the correlation module 228, the calibration module 230, the CEP module 232, the normalization module 234, and the error module 236, or various other components described herein, as described with respect to FIG. 2.

Various embodiments of the disclosure comprise the content management system 102 that may be configured for controlling the digital cinematic content based on emotional state of characters. The content management system 102 may comprise various components, for example, the first network interface 202 and the first memory 216 (comprising the first RAM 220 and the first ROM 222), the first processor 204, the AI engine 206, the I/O module 208, the data source 210, the character profile database 212, the content metadata 214, the application data 224, the ML module 226, the correlation module 228, the calibration module 230, the CEP module 232, the normalization module 234, and the error module 236.

The content management system 102 may include a memory, such as the first memory 216, for storing instructions and a processor, such as the first processor 204, for executing the instructions. Based on the executed instructions, one or more processors in the content management system 102 may be configured to determine a focus on one or more computer-controlled characters 112a or 112b appearing in digital cinematic content 116 based on emotion indicators of the first user 110 actively interacting with at least the one or more computer-controlled characters 112a or 112b. The one or more processors in the content management system 102 may be further configured to infer a set of emotion indicators for each of the one or more computer-controlled characters 112a and 112b based on one or more criteria. The one or more processors in the content management system 102 may be further configured to create multifactor feedback loops based on the inferred set of emotion indicators of each of the one or more computer-controlled characters 112a and 112b. The one or more processors in the content management system 102 may be further configured to control at least a story line of the digital cinematic content 116 and behavioural characteristics of the one or more computer-controlled characters 112a and 112b to achieve a target emotional arc of the first user 110 based on the multifactor feedback loops.

In accordance with an embodiment, the one or more processors in the content management system 102 may be further configured to select a next scene in a narrative branch based on the target emotional arc of the first user 110 and the inferred set of emotion indicators for each of the one or more computer-controlled characters 112a and 112b for the controlled story line of the digital cinematic content 116.

In accordance with an embodiment, the one or more processors in the content management system 102 may be further configured to adjust the focus, emotional goals, and tactics of the one or more computer-controlled characters 112a and 112b for the controlled behavioural characteristics of the one or more computer-controlled characters 112a and 112b.

In accordance with an embodiment, the one or more processors in the content management system 102 may be further configured to adjust next dialogues for the one or more computer-controlled characters 112a and 112b based on the adjusted focus, the adjusted emotional goals, and the adjusted tactics of the one or more computer-controlled characters 112a and 112b.

In accordance with an embodiment, the one or more processors in the content management system 102 may be further configured to determine a semantics of the set of emotion indicators based on a social appraisal by a focus group for at least the set of emotion indicators. The inference of the set of emotion indicators for each of the one or more computer-controlled characters 112a and 112b is based on a first criterion from the one or more criteria that corresponds to the semantics of the set of emotion indicators.

In accordance with an embodiment, the one or more processors in the content management system 102 may be further configured to detect at least one of an action, an inaction, or a body language of the one or more computer-controlled characters 112a and 112b based on one or more computer vision techniques. The inference of the set of emotion indicators for each of the one or more computer-controlled characters 112a and 112b is based on a second criterion from the one or more criteria that corresponds to the action or the body language of the one or more computer-controlled characters 112a and 112b.

In accordance with an embodiment, the one or more processors in the content management system 102 may be further configured to determine sentiments of the one or more computer-controlled characters 112a and 112b based on one or more sentiment detection techniques. The inference of the set of emotion indicators for each of the one or more computer-controlled characters 112a and 112b is based on a third criterion from the one or more criteria that corresponds to the sentiments of the one or more computer-controlled characters 112a and 112b.

In accordance with an embodiment, the one or more processors in the content management system 102 may be further configured to determine an emotive or emotional conjugation that indicates a form of a grammatical conjugation for describing, by a computer-controlled character, own behavior more charitably than others. The inference of the set of emotion indicators for each of the one or more computer-controlled characters 112a and 112b is based on a fourth criterion from the one or more criteria that corresponds to the emotive or emotional conjugation of the one or more computer-controlled characters 112a and 112b.

In accordance with an embodiment, the one or more processors in the content management system 102 may be further configured to determine arousal and valence values for the one or more computer-controlled characters 112a and 112b based on a plurality of words spoken by the one or more computer-controlled characters 112a and 112b and connotation of the plurality of words. The inference of the set of emotion indicators for each of the one or more computer-controlled characters 112a and 112b is based on a fifth criterion from the one or more criteria that corresponds to the arousal and the valence values based on the plurality of words spoken by the one or more computer-controlled characters 112a and 112b.

In accordance with an embodiment, the one or more processors in the content management system 102 may be further configured to determine a digital representation of the CEP based on cumulative arousal and valence values. The cumulative arousal and valence values may be based on the set of emotion indicators inferred for each of the one or more computer-controlled characters 112a and 112b and emotion indicators of the first user 110. The emotion indicators of the first user 110 are determined based on sensor data from at least one sensor positioned to sense an involuntary response of the first user 110 while engaged with the digital cinematic content 116.

In accordance with an embodiment, the one or more processors in the content management system 102 may be further configured to perform calibration for sensor data pertaining to the first user 110 to calibrate user reactions to a known stimuli and normalize the sensor data for genre differences.

In accordance with an embodiment, the one or more processors in the content management system 102 may be further configured to calculate event powers for each measure of concern pertaining to the first user 110 and the one or more computer-controlled characters 112a and 112b. The one or more processors may aggregate the event powers for the digital cinematic content 116 after play is concluded.

In accordance with an embodiment, the one or more processors in the content management system 102 may be further configured to calculate the CEP based on a ratio of the aggregated event powers by an expectation power.

In accordance with an embodiment, the one or more processors in the content management system 102 may be further configured to compare an event power for each detected event with a target emotional arc defined for the digital cinematic content 116. Accordingly, the one or more processors may determine, based on the comparison, error vector and matrix of vectors for evaluation or control of the digital cinematic content 116. In accordance with an embodiment, the target emotional arc may comprise a set of targeted digital representations of the cumulative valence values, each uniquely associated with a different interval of a continuous time sequence.

In accordance with an embodiment, the one or more processors in the content management system 102 may be further configured to receive sensor data from at least one sensor positioned to sense an involuntary response of the first user 110 while engaged with the digital cinematic content 116. Further, the emotion indicators of the first user 110 actively interacting with at least the one or more computer-controlled characters 112a and 112b in the one or more computer-controlled characters 112a and 112b may be determined. The emotion indicators of the first user 110 and the inferred emotion indicators for each of the one or more computer-controlled characters 112a and 112b are based on emotion-influencing objects that appear in a scene. The emotion-influencing objects controls at least one of an appearance or the scene, and audio content of the scene. The emotion-influencing objects comprise at least one of previously described computer-controlled characters and scripts, props, backgrounds, environments, lighting schemes, surface colors and textures, audio tracks, or any object in a scene that is controlled to evoke an emotional response in the first user.

In accordance with an embodiment, the sensor data may comprises one or more of electroencephalographic (EEG) data, facial electromyography (fEMG) data, video facial action unit (FAU) data, brain machine interface (BMI) data, functional magnetic imaging (fMRI) data, body chemical sensing data, subvocalization data and functional near-infrared data (fNIR), phased array radar (PAR), and phased array microphone (PAM).

Various embodiments of the disclosure may provide a computer readable medium, such as the non-transitory computer-readable medium 1106, having stored thereon, computer implemented instruction that when executed by the hardware processor 1104 causes the content management system 102 to execute operations for controlling digital cinematic content based on emotional state of characters. In accordance with an embodiment, the hardware processor 1104 causes the content management system 102 execute operations to determine a focus on one or more computer-controlled characters 112a and 112b appearing in digital cinematic content 116 based on emotion indicators of the first user 110 actively interacting with at least the one or more computer-controlled characters 112a and 112b. The hardware processor 1104 further causes the content management system 102 execute operations to infer a set of emotion indicators for each of the one or more computer-controlled characters 112a and 112b based on one or more criteria. The hardware processor 1104 further causes the content management system 102 execute operations to creating multifactor feedback loops based on the inferred set of emotion indicators of each of the one or more computer-controlled characters 112a and 112b. The hardware processor 1104 further causes the content management system 102 execute operations to control a story line of the digital cinematic content 116 and behavioural characteristics of the one or more computer-controlled characters 112a and 112b to achieve a target emotional arc of the first user 110 based on the multifactor feedback loops.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-Ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-Ray™ or other format), smart cards, and flash memory devices (e.g., card, stick, or another format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for controlling digital cinematic content based on emotional state of characters.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A system, comprising:
   a memory for storing instructions; and
   a processor configured to execute the instructions, and based on the executed instructions, the processor is further configured to:
   determine a focus on one or more computer-controlled characters appearing in digital cinematic content based on emotion indicators of a first user actively interacting with at least the one or more computer-controlled characters;
   infer a set of emotion indicators for each of the one or more computer-controlled characters based on one or more criteria associated with the one or more computer-controlled characters;
   create multifactor feedback loops based on the inferred set of emotion indicators of each of the one or more computer-controlled characters,
      wherein the multifactor feedback loops correspond to factors associated with a story line and a content engagement power (CEP) value of the digital cinematic content, and behavioural characteristics of the one or more computer-controlled characters; and
   generate a target emotional arc of the first user defined for the digital cinematic content based on the multifactor feedback loops and a comparison of the emotional indicators of the first user to the target emotional arc.

2. The system according to claim 1, wherein the processor is further configured to select a next scene in a narrative branch based on the target emotional arc of the first user and the inferred set of emotion indicators for each of the one or more computer-controlled characters for a controlled story line of the digital cinematic content.

3. The system according to claim 1, wherein the processor is further configured to adjust the focus, emotional goals, and tactics of the one or more computer-controlled characters for the behavioural characteristics of the one or more computer-controlled characters.

4. The system according to claim 3, wherein the processor is further configured to adjust next dialogues for the one or more computer-controlled characters based on the adjusted focus, the emotional goals, and the tactics of the one or more computer-controlled characters.

5. The system according to claim 1, wherein the processor is further configured to determine a semantics of the set of emotion indicators based on a social appraisal by a focus group for at least the set of emotion indicators,
   wherein the inference of the set of emotion indicators for each of the one or more computer-controlled characters is based on a first criterion from the one or more criteria that corresponds to the semantics of the set of emotion indicators.

6. The system according to claim 1, wherein the processor is further configured to detect at least one of an action, an inaction, or a body language of the one or more computer-controlled characters based on one or more computer vision techniques,
   wherein the inference of the set of emotion indicators for each of the one or more computer-controlled characters is based on a second criterion from the one or more criteria that corresponds to the action or the body language of the one or more computer-controlled characters.

7. The system according to claim 1, wherein the processor is further configured to determine sentiments of the one or more computer-controlled characters based on one or more sentiment detection techniques,
   wherein the inference of the set of emotion indicators for each of the one or more computer-controlled characters is based on a third criterion from the one or more criteria that corresponds to the sentiments of the one or more computer-controlled characters.

8. The system according to claim 1, wherein the processor is further configured to determine an emotive or emotional conjugation that indicates a form of a grammatical conjugation for describing, by a computer-controlled character, own behavior more charitably than others,
   wherein the inference of the set of emotion indicators for each of the one or more computer-controlled characters is based on a fourth criterion from the one or more criteria that corresponds to the emotive or emotional conjugation of the one or more computer-controlled characters.

9. The system according to claim 1, wherein the processor is further configured to determine arousal and valence values for the one or more computer-controlled characters based on a plurality of words spoken by the one or more computer-controlled characters and connotation of the plurality of words,
   wherein the inference of the set of emotion indicators for each of the one or more computer-controlled characters is based on a fifth criterion from the one or more criteria that corresponds to the arousal and the valence values based on the plurality of words spoken by the one or more computer-controlled characters.

10. The system according to claim 9, wherein the processor is further configured to determine a digital representation of the CEP value of the digital cinematic content based on cumulative arousal and valence values,
wherein the cumulative arousal and valence values are based on the set of emotion indicators inferred for each of the one or more computer-controlled characters and emotion indicators of the first user, and
wherein the emotion indicators of the first user are determined based on sensor data from at least one sensor positioned to sense an involuntary response of the first user while engaged with the digital cinematic content.

11. The system according to claim 10, wherein the processor is further configured to:
perform calibration for the sensor data pertaining to the first user to calibrate user reactions to a known stimuli; and
normalize the sensor data for genre differences.

12. The system according to claim 10, wherein the processor is further configured to:
calculate event powers for each measure of concern pertaining to the first user and the one or more computer-controlled characters; and
aggregate the event powers for the digital cinematic content after play is concluded.

13. The system according to claim 12, wherein the processor is further configured to calculate the CEP value of the digital cinematic content based on a ratio of the aggregated event powers by an expectation power.

14. The system according to claim 12, wherein the processor is further configured to:
compare an event power for each detected event with the target emotional arc defined for the digital cinematic content; and
determine, based on the comparison, error vector and matrix of vectors for evaluation or control of the digital cinematic content.

15. The system according to claim 14, wherein the target emotional arc comprises a set of targeted digital representations of the cumulative valence values, each uniquely associated with a different interval of a continuous time sequence.

16. The system according to claim 1, wherein the processor is further configured to:
receive sensor data from at least one sensor positioned to sense an involuntary response of the first user while engaged with the digital cinematic content; and
determine the emotion indicators of the first user actively interacting with at least the one or more computer-controlled characters in the digital cinematic content,
wherein the emotion indicators of the first user and the inferred set of emotion indicators for each of the one or more computer-controlled characters are based on emotion-influencing objects that appear in a scene,
wherein the emotion-influencing objects controls at least one of an appearance or the scene, and audio content of the scene, and
wherein the emotion-influencing objects comprises at least one of computer-controlled characters and scripts, props, backgrounds, environments, lighting schemes, surface colors and textures, audio tracks, or any object in the scene that is controlled to evoke an emotional response in the first user.

17. The system according to claim 16, wherein the sensor data comprises one or more of electroencephalographic (EEG) data, facial electromyography (fEMG) data, video facial action unit (FAU) data, brain machine interface (BMI) data, functional magnetic imaging (fMRI) data, body chemical sensing data, subvocalization data and functional near-infrared data (fNIR), phased array radar (PAR), and phased array microphone (PAM).

18. A method, comprising:
determining, by a processor, a focus on one or more computer-controlled characters appearing in digital cinematic content based on emotion indicators of a first user actively interacting with at least the one or more computer-controlled characters;
inferring, by the processor, a set of emotion indicators for each of the one or more computer-controlled characters based on one or more criteria associated with the one or more computer-controlled characters;
creating, by the processor, multifactor feedback loops based on the inferred set of emotion indicators of each of the one or more computer-controlled characters,
wherein the multifactor feedback loops correspond to factors associated with a story line and a content engagement power (CEP) value of the digital cinematic content, and behavioural characteristics of the one or more computer-controlled characters; and
generating, by the processor, a target emotional arc of the first user defined for the digital cinematic content based on the multifactor feedback loops and a comparison of the emotional indicators of the first user to the target emotional arc.

19. The method according to claim 18, further comprising:
selecting, by the processor, a next scene in a narrative branch based on the target emotional arc of the first user and the inferred set of emotion indicators for each of the one or more computer-controlled characters for a controlled story line of the digital cinematic content;
adjusting, by the processor, the focus, emotional goals, and tactics of the one or more computer-controlled characters for the behavioural characteristics of the one or more computer-controlled characters; and
adjusting, by the processor, next dialogues for the one or more computer-controlled characters based on the adjusted focus, the emotional goals, and the tactics of the one or more computer-controlled characters.

20. A non-transitory computer readable medium, having stored thereon, computer executable code, which when executed by a processor, cause the processor to execute operations, the operations comprising:
determining a focus on one or more computer-controlled characters appearing in digital cinematic content based on emotion indicators of a first user actively interacting with at least the one or more computer-controlled characters;
inferring a set of emotion indicators for each of the one or more computer-controlled characters based on one or more criteria associated with the one or more computer-controlled characters;
creating multifactor feedback loops based on the inferred set of emotion indicators of each of the one or more computer-controlled characters,
wherein the multifactor feedback loops correspond to factors associated with a story line and a content engagement power (CEP) value of the digital cinematic content, and behavioural characteristics of the one or more computer-controlled characters; and
generating a target emotional arc of the first user defined for the digital cinematic content based on the multifactor feedback loops and a comparison of the emotional indicators of the first user to the target emotional arc.

\* \* \* \* \*